(12) United States Patent
Ye et al.

(10) Patent No.: US 12,269,164 B2
(45) Date of Patent: Apr. 8, 2025

(54) METHOD AND COMPUTING SYSTEM FOR PERFORMING ROBOT MOTION PLANNING AND REPOSITORY DETECTION

(71) Applicant: MUJIN, INC., Tokyo (JP)

(72) Inventors: Xutao Ye, Tokyo (JP); Hamdi Sahloul, Tokyo (JP); Puttichai Lertkultanon, Tokyo (JP); Rosen Nikolaev Diankov, Tokyo (JP)

(73) Assignee: MUJIN, INC., Tokyo (JP)

( * ) Notice: Subject to any disclaimer, the term of this patent is extended or adjusted under 35 U.S.C. 154(b) by 227 days.

(21) Appl. No.: 17/733,024

(22) Filed: Apr. 29, 2022

(65) Prior Publication Data

US 2022/0355474 A1   Nov. 10, 2022

Related U.S. Application Data

(60) Provisional application No. 63/183,685, filed on May 4, 2021.

(51) Int. Cl.
*B25J 9/16* (2006.01)

(52) U.S. Cl.
CPC ......... *B25J 9/1635* (2013.01); *B25J 9/1633* (2013.01)

(58) Field of Classification Search
CPC ...... B25J 9/1635; B25J 9/1633; B25J 9/1679; B25J 9/1687; B25J 9/161; B25J 9/00; B25J 9/1661; B25J 9/1697; B25J 13/08; B25J 19/02; B25J 5/005; B25J 5/007; B25J 9/0093; B25J 9/162; B25J 9/1628; B25J 9/1656; B25J 9/1664; B25J 9/1684; B25J 11/0095; B25J 19/021; G05B 2219/50393; G05B 2219/39102; G05B 2219/45063;

(Continued)

(56) References Cited

U.S. PATENT DOCUMENTS

2010/0198395 A1* 8/2010 Sasaki ............... B25J 9/023
901/50
2018/0319607 A1* 11/2018 Nemati ............. G05B 19/4182

(Continued)

FOREIGN PATENT DOCUMENTS

JP    2018-020423 A    2/2018
JP    2019025566 A     2/2019

(Continued)

OTHER PUBLICATIONS

International Search Report and Written Opinion issued in corresponding International Patent Application No. PCT/US2022/027457 dated Aug. 9, 2022.

(Continued)

*Primary Examiner* — Bhavesh V Amin
*Assistant Examiner* — Esvinder Singh
(74) *Attorney, Agent, or Firm* — MEDLER FERRO WOODHOUSE & MILLS PLLC

(57) ABSTRACT

A method and computing system for transferring objects between a source repository and a destination repository is provided. The computing system is configured to operate by a combination of pre-planned and image base trajectories to improve speed and reliability of object transfer. The computing system is configured to capture image information of repositories and use the captured information to alter or adjust pre-planned trajectories to improve performance.

19 Claims, 22 Drawing Sheets

(58) Field of Classification Search
CPC ...... G05B 2219/40007; G05B 19/4182; G05B 2219/40554; G05B 2219/45054
See application file for complete search history.

(56) References Cited

U.S. PATENT DOCUMENTS

| | | | |
|---|---|---|---|
| 2019/0034727 A1* | 1/2019 | Chihara | G06T 7/74 |
| 2020/0101613 A1* | 4/2020 | Yamada | B25J 9/1687 |
| 2020/0269429 A1* | 8/2020 | Chavez | B25J 19/023 |
| 2020/0391385 A1* | 12/2020 | Oka | B25J 9/1666 |
| 2021/0122046 A1 | 4/2021 | Zhouwen et al. | |
| 2022/0009108 A1 | 1/2022 | Mitsuo et al. | |
| 2023/0001587 A1* | 1/2023 | Zak | B25J 9/1676 |
| 2023/0111540 A1* | 4/2023 | Lin | G06T 7/50 |
| | | | 700/259 |
| 2023/0286752 A1* | 9/2023 | Lin | B65G 1/0492 |
| 2024/0051770 A1* | 2/2024 | Dettorre | B29D 30/0016 |

FOREIGN PATENT DOCUMENTS

| | | |
|---|---|---|
| JP | 2021-020266 A | 2/2021 |
| JP | 2021-139879 A | 9/2021 |
| KR | 10-2220304 B1 | 2/2021 |
| WO | 2019/187779 A1 | 10/2019 |
| WO | 2020100908 A1 | 5/2020 |

OTHER PUBLICATIONS

Decision to Grant issued in corresponding Japanese Patent Application No. 2022-076186.
Japanese Office Action dated Oct. 18, 2022 issued in corresponding Japanese Application No. 2022-076186.

* cited by examiner

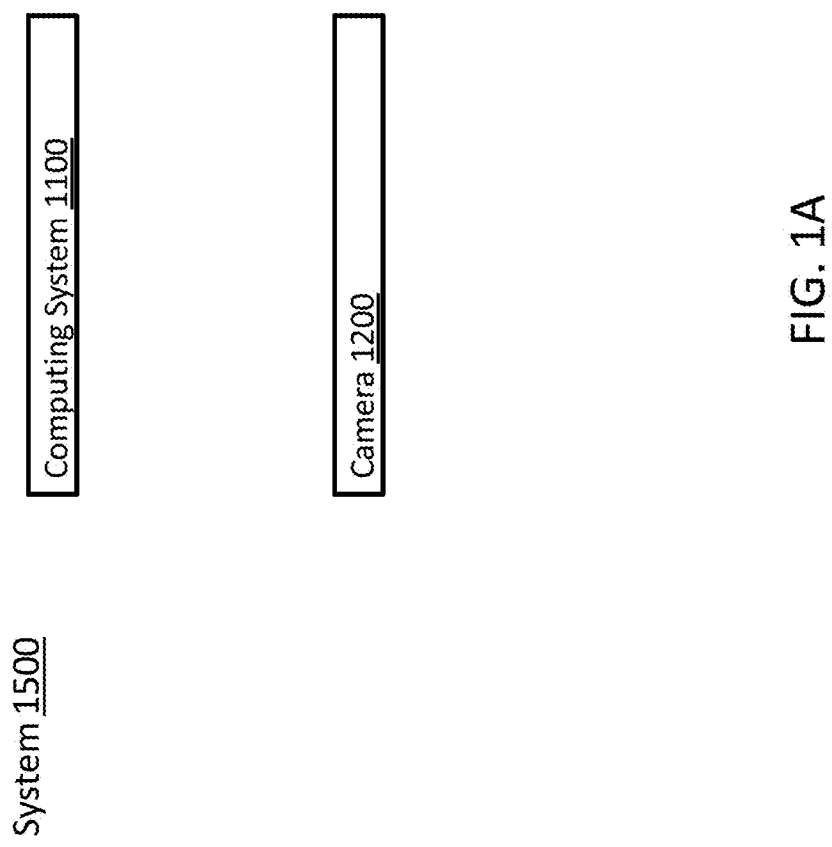

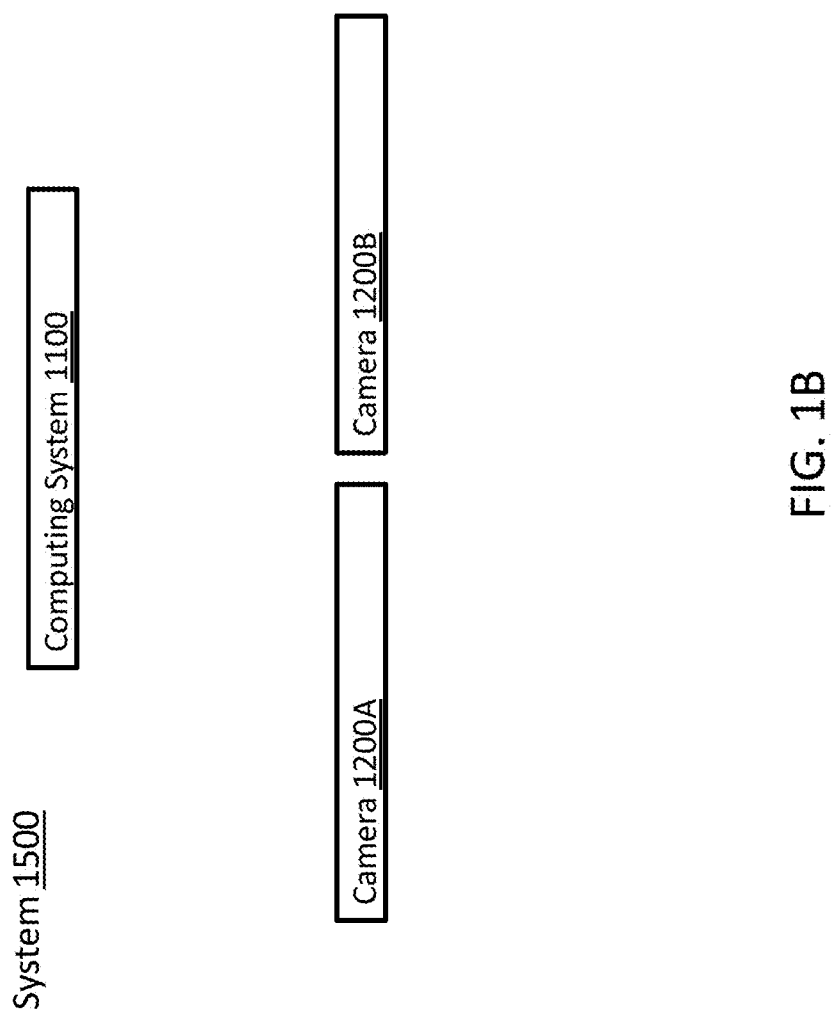

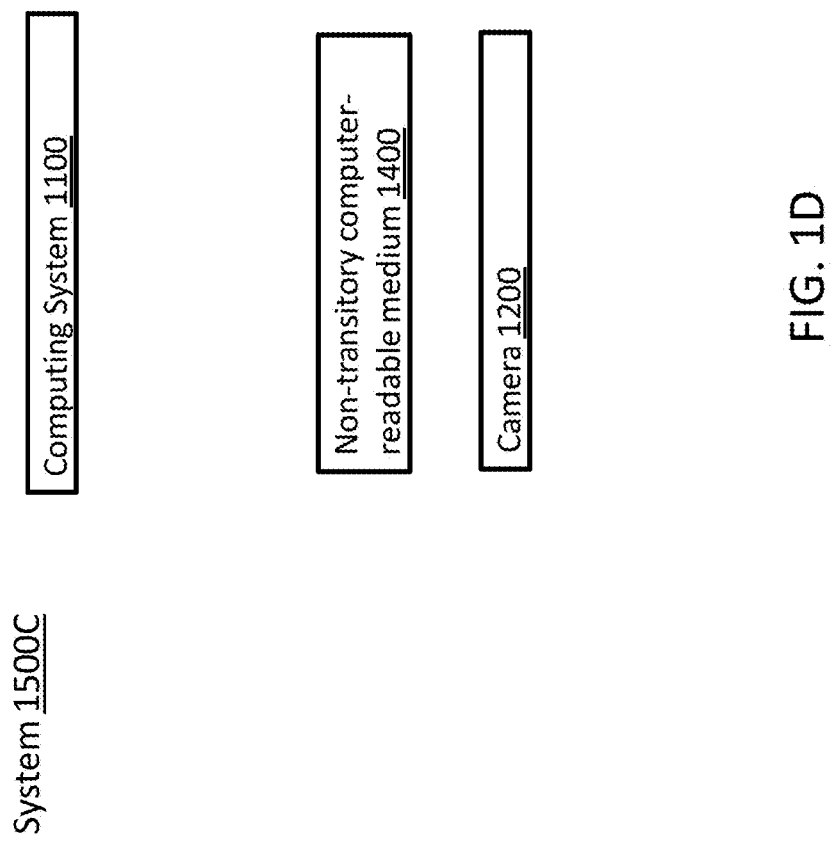

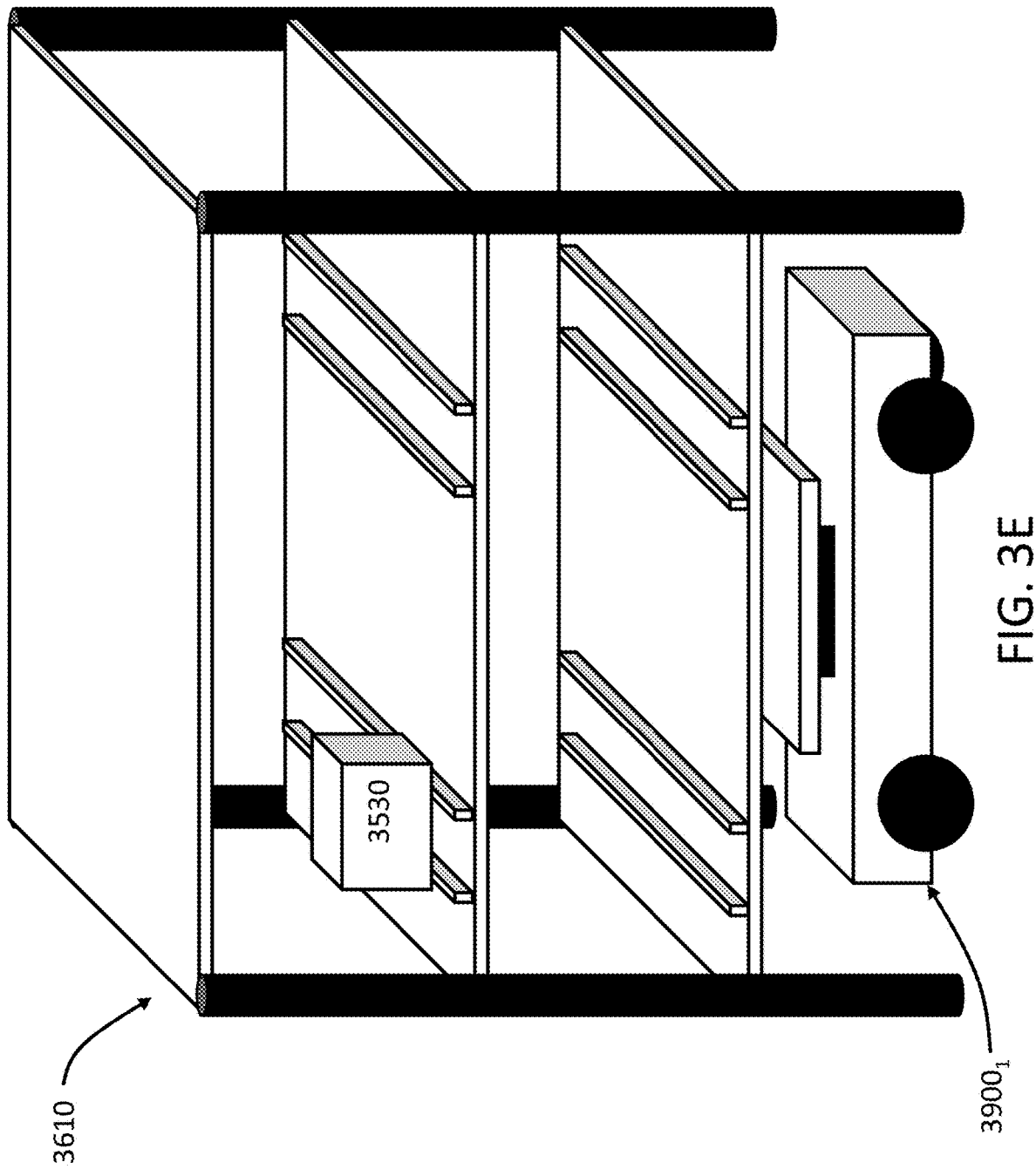

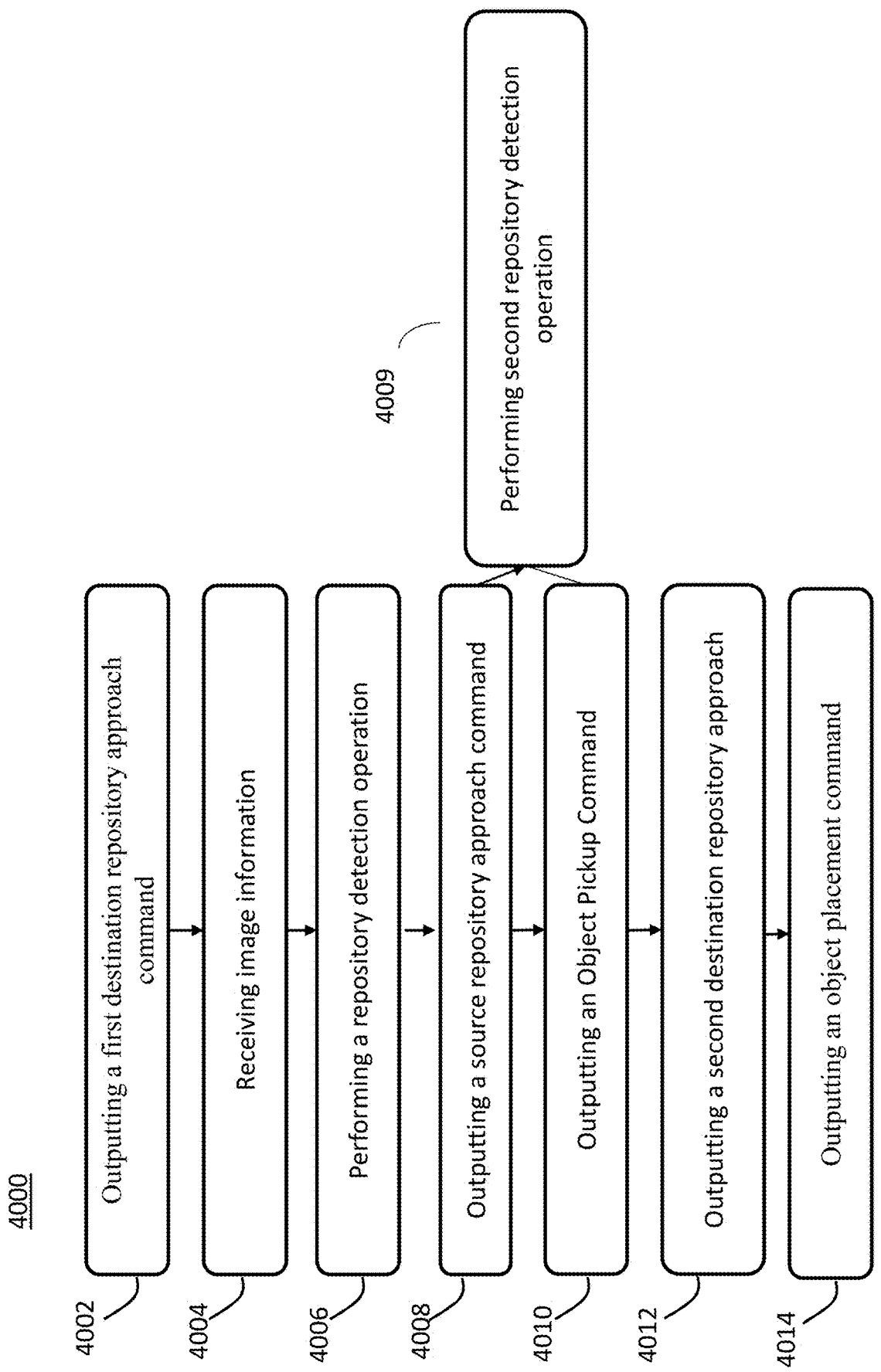

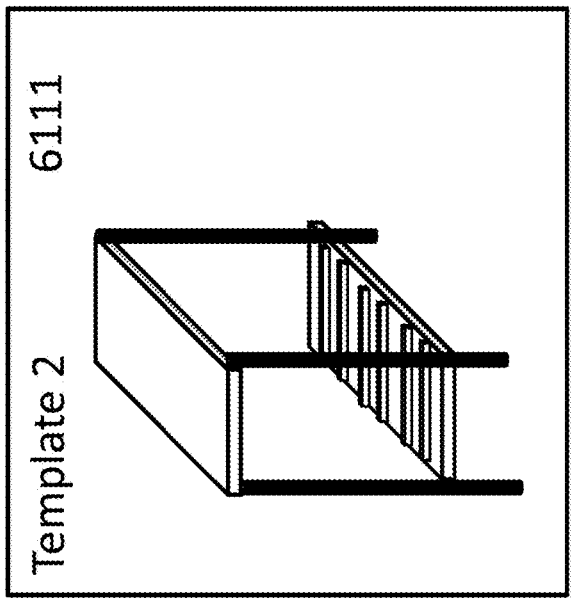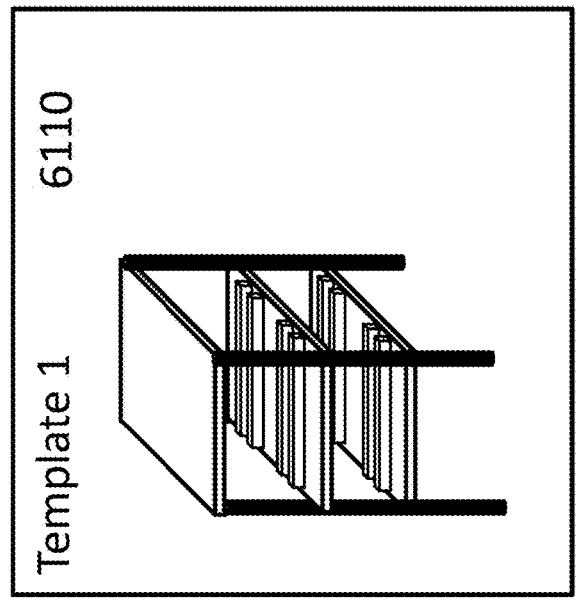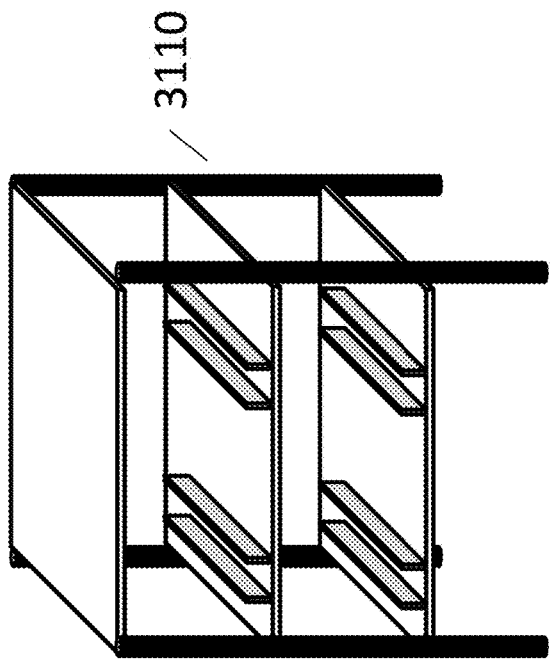
FIG. 6

METHOD AND COMPUTING SYSTEM FOR PERFORMING ROBOT MOTION PLANNING AND REPOSITORY DETECTION

CROSS-REFERENCE TO RELATED APPLICATION(S)

The present application claims the benefit of U.S. Provisional Appl. No. 63/183,685, entitled "ROBOTIC SYSTEM FOR ADJUSTING ROBOT TRAJECTORY" and filed May 4, 2021, the entire content of which is incorporated by reference herein.

FIELD OF THE INVENTION

The present technology is directed generally to robotic systems and, more specifically, to systems, processes, and techniques for performing object size measurement and/or minimum viable region detection.

BACKGROUND

With their ever-increasing performance and lowering cost, many robots (e.g., machines configured to automatically/autonomously execute physical actions) are now extensively used in various different fields. Robots, for example, can be used to execute various tasks (e.g., manipulate or transfer an object through space) in manufacturing and/or assembly, packing and/or packaging, transport and/or shipping, etc. In executing the tasks, the robots can replicate human actions, thereby replacing or reducing human involvements that are otherwise required to perform dangerous or repetitive tasks.

SUMMARY

In an embodiment, a computing system is provided. The computing system includes a communication interface configured to communicate with a robot having a robot arm that includes or is attached to an end effector apparatus, and having a camera attached to the robot arm; at least one processing circuit configured, when the robot is in an object transfer region that includes a source repository and a destination repository, to perform the following steps for transferring an object from the source repository to the destination repository. The steps include outputting a first destination repository approach command for causing the robot arm to approach the destination repository in a manner that causes the camera to be pointed at the destination repository; receiving image information for describing the destination repository, wherein the image information is generated by the camera after the first destination repository approach command is executed; performing, based on the image information, a repository detection operation that determines at least one of: repository structure information for describing a structure of the destination repository, repository pose information for describing a pose of the destination repository, or repository content information for describing whether one or more objects are present in the destination repository; outputting a source repository approach command for causing the robot arm to approach the source repository after the camera has generated the image information for describing the destination repository; outputting an object pickup command for causing the end effector apparatus to pick up the object from the source repository after the source repository approach command is executed; outputting a second destination repository approach command for causing the robot arm to approach the destination repository after the object pickup command is executed; outputting an object placement command for causing the end effector apparatus to place the object in the destination repository after the second destination repository approach command is executed, wherein the object placement command is generated based on a result of the repository detection operation, wherein the result includes at least one of the repository structure information, the repository pose information, or the repository content information.

In an embodiment, a robotic control method, for transferring an object from a source repository to a destination repository is provided. The method is operable by at least one processing circuit via a communication interface configured to communicate with a robot having a robot arm that includes or is attached to an end effector apparatus, and having a camera attached to the robot arm. The method includes outputting a first destination repository approach command for causing the robot arm to approach the destination repository in a manner that causes the camera to be pointed at the destination repository; receiving image information for describing the destination repository, wherein the image information is generated by the camera after the first destination repository approach command is executed; performing, based on the image information, a repository detection operation that determines at least one of: repository structure information for describing a structure of the destination repository, repository pose information for describing a pose of the destination repository, or repository content information for describing whether one or more objects are present in the destination repository; outputting a source repository approach command for causing the robot arm to approach the source repository after the camera has generated the image information for describing the destination repository; outputting an object pickup command for causing the end effector apparatus to pick up the object from the source repository after the source repository approach command is executed; outputting a second destination repository approach command for causing the robot arm to approach the destination repository after the object pickup command is executed; outputting an object placement command for causing the end effector apparatus to place the object in the destination repository after the second destination repository approach command is executed, wherein the object placement command is generated based on a result of the repository detection operation, wherein the result includes at least one of the repository structure information, the repository pose information, or the repository content information.

In an embodiment, a non-transitory computer readable medium is provided. The non-transitory computer readable medium is configured with executable instructions for implementing a robotic control method for transferring an object from a source repository to a destination repository, operable by at least one processing circuit via a communication interface configured to communicate with a robot having a robot arm that includes or is attached to an end effector apparatus, and having a camera attached to the robot arm. The method includes outputting a first destination repository approach command for causing the robot arm to approach the destination repository in a manner that causes the camera to be pointed at the destination repository; receiving image information for describing the destination repository, wherein the image information is generated by the camera after the first destination repository approach command is executed; performing, based on the image information, a repository detection operation that determines at least one of: repository structure information for describing a structure of the destination repository, repository pose information for describing a pose of the destination repository, or repository content information for describing whether one or more objects are present in the destination repository; outputting a source repository approach command for causing the robot arm to approach the source repository after the camera has generated the image information for describing the destination repository; outputting an object pickup command for causing the end effector apparatus to pick up the object from the source repository after the source repository approach command is executed; outputting a second destination repository approach command for causing the robot arm to approach the destination repository after the object pickup command is executed; and outputting an object placement command for causing the end effector apparatus to place the object in the destination repository after the second destination repository approach command is executed, wherein the object placement command is generated based on a result of the repository detection operation, wherein the result includes at least one of the repository structure information, the repository pose information, or the repository content information.

BRIEF DESCRIPTION OF THE FIGURES

FIGS. 1A-1D illustrate systems for performing or facilitating defining a minimum viable region, consistent with embodiments hereof.

FIGS. 3A-3F illustrate environments in which defining a minimum viable region may be performed, according to embodiments hereof.

FIG. 4 provides a flow diagram that illustrates a method of defining a minimum viable region, according to an embodiment hereof.

FIG. 6 illustrates repository templates consistent with embodiments hereof.

DETAILED DESCRIPTION OF THE FIGURES

Figure 1C:
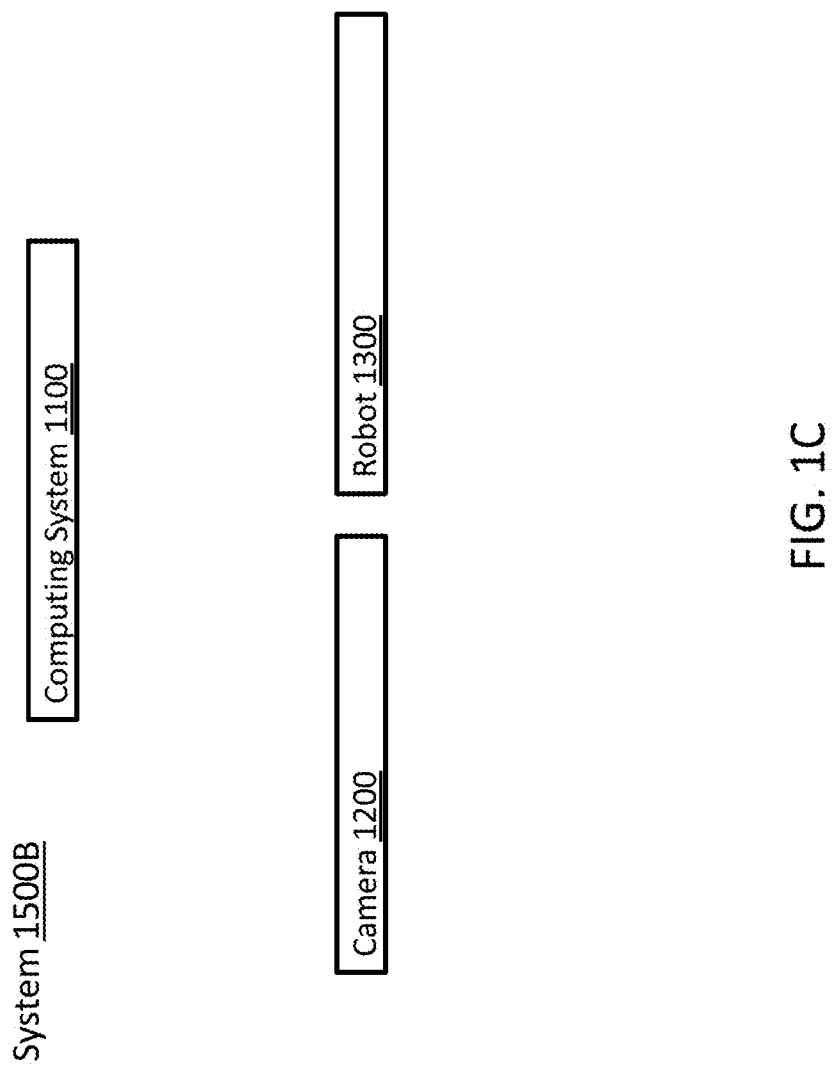

Systems and methods for a robotic system with a coordinated transfer mechanism are described herein. The robotic system (e.g., an integrated system of devices that each execute one or more designated tasks) configured in accordance with embodiments describe herein autonomously executes integrated tasks by coordinating operations of multiple units (e.g., robots).

The technology described herein provides technical improvements to the existing computer-based image recognition and robotic control fields. Technical improvements provide an increase in overall speed, reliability, and accuracy of robotic trajectory planning operations. Robotic trajectory planning operations described herein include a combination of pre-planned trajectories and adjusted trajectories to accomplish robotic tasks (grabbing and moving objects) with greater speed, reliability, and accuracy.

In particular, the present technology described herein improves a robotic system by permitting the intelligent combination of pre-planned trajectories and adjusted trajectories. Pre-planned trajectories may be employed to permit a robotic arm to move quickly throughout a loading/unloading zone without the necessity of significant computation during movement. Strict reliance on pre-planned trajectories, however, may have the disadvantage of decreased accuracy and reliability in situations where sources and destinations of objects have variance. Image analysis adjusted trajectories may provide more accurate and reliable picking and placing of objects, at the expense of speed. Systems and methods described herein combine both pre-planned trajectories and image assisted trajectories to increase speed, accuracy, and reliability over either method alone. Pre-planned trajectories may be used to position a robotic arm close to a goal location while image assisted trajectories may be employed to adjust or fine-tune a final trajectory for picking or placing an object. Accordingly, the methods and systems described herein provide a technical solution to a technical problem arising in the technical field of computer assisted robotic control.

In the following, specific details are set forth to provide an understanding of the presently disclosed technology. In embodiments, the techniques introduced here may be practiced without including each specific detail disclosed herein. In other instances, well-known features, such as specific functions or routines, are not described in detail to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments. It is to be understood that the various embodiments shown in the figures are merely illustrative representations and are not necessarily drawn to scale.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments may have different configurations or different components than those described in this section. Accordingly, the disclosed techniques may have other embodiments with additional elements or without several of the elements described below.

Many embodiments or aspects of the present disclosure described below may take the form of computer- or controller-executable instructions, including routines executed by a programmable computer or controller. Those skilled in the relevant art will appreciate that the disclosed techniques can be practiced on or with computer or controller systems other than those shown and described below. The techniques described herein can be embodied in a special-purpose computer or data processor that is specifically programmed, configured, or constructed to execute one or more of the computer-executable instructions described below. Accordingly, the terms "computer" and "controller" as generally used herein refer to any data processor and can include Internet appliances and handheld devices (including palm-top computers, wearable computers, cellular or mobile phones, multi-processor systems, processor-based or programmable consumer electronics, network computers, mini-computers, and the like). Information handled by these computers and controllers can be presented at any suitable display medium, including a liquid crystal display (LCD). Instructions for executing computer- or controller-executable tasks can be stored in or on any suitable computer-readable medium, including hardware, firmware, or a combination of hardware and firmware. Instructions can be contained in any suitable memory device, including, for example, a flash drive, USB device, and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements co-operate or interact with each other (e.g., as in a cause-and-effect relationship, such as for signal transmission/reception or for function calls), or both.

Any reference herein to image analysis by a computing system may be performed according to or using spatial structure information that may include depth information which describes respective depth value of various locations relative a chosen point. The depth information may be used to identify objects or estimate how objects are spatially arranged. In some instances, the spatial structure information may include or may be used to generate a point cloud that describes locations of one or more surfaces of an object. Spatial structure information is merely one form of possible image analysis and other forms known by one skilled in the art may be used in accordance with the methods described herein.

FIG. 1A illustrates a system 1500 for performing object detection, or, more specifically, object recognition. More particularly, the system 1500 may include a computing system 1100 and a camera 1200. In this example, the camera 1200 may be configured to generate image information which describes or otherwise represents an environment in which the camera 1200 is located, or, more specifically, represents an environment in the camera's 1200 field of view (also referred to as a camera field of view). The environment may be, e.g., a warehouse, a manufacturing plant, a retail space, or other premises. In such instances, the image information may represent objects located at such premises, such as boxes, bins, cases, crates, or other containers. The system 1500 may be configured to generate, receive, and/or process the image information, such as by using the image information to distinguish between individual objects in the camera field of view, to perform object recognition or object registration based on the image information, and/or perform robot interaction planning based on the image information, as discussed below in more detail (the terms "and/or" and "or" are used interchangeably in this disclosure). The robot interaction planning may be used to, e.g., control a robot at the premises to facilitate robot interaction between the robot and the containers or other objects. The computing system 1100 and the camera 1200 may be located at the same premises or may be located remotely from each other. For instance, the computing system 1100 may be part of a cloud computing platform hosted in a data center which is remote from the warehouse or retail space and may be communicating with the camera 1200 via a network connection.

In an embodiment, the camera 1200 (which may also be referred to as an image sensing device) may be a 2D camera and/or a 3D camera. For example, FIG. 1B illustrates a system 1500A (which may be an embodiment of the system 1500) that includes the computing system 1100 as well as a camera 1200A and a camera 1200B, both of which may be an embodiment of the camera 1200. In this example, the camera 1200A may be a 2D camera that is configured to generate 2D image information which includes or forms a 2D image that describes a visual appearance of the environment in the camera's field of view. The camera 1200B may be a 3D camera (also referred to as a spatial structure sensing camera or spatial structure sensing device) that is configured to generate 3D image information which includes or forms spatial structure information regarding an environment in the camera's field of view. The spatial structure information may include depth information (e.g., a depth map) which describes respective depth values of various locations relative to the camera 1200B, such as locations on surfaces of various objects in the camera 1200's field of view. These locations in the camera's field of view or on an object's surface may also be referred to as physical locations. The depth information in this example may be used to estimate how the objects are spatially arranged in three-dimensional (3D) space. In some instances, the spatial structure information may include or may be used to generate a point cloud that describes locations on one or more surfaces of an object in the camera 1200B's field of view. More specifically, the spatial structure information may describe various locations on a structure of the object (also referred to as an object structure).

In an embodiment, the system 1500 may be a robot operation system for facilitating robot interaction between a robot and various objects in the environment of the camera 1200. For example, FIG. 1C illustrates a robot operation system 1500B, which may be an embodiment of the system 1500/1500A of FIGS. 1A and 1B. The robot operation system 1500B may include the computing system 1100, the camera 1200, and a robot 1300. As stated above, the robot 1300 may be used to interact with one or more objects in the environment of the camera 1200, such as with boxes, crates, bins, or other containers. For example, the robot 1300 may be configured to pick up the containers from one location and move them to another location. In some cases, the robot 1300 may be used to perform a de-palletization operation in which a group of containers or other objects are unloaded and moved to, e.g., a conveyor belt. In some implementations, the camera 1200 may be attached to the robot 1300, such as to a robot arm 3320 of the robot 1300. In some implementations, the camera 1200 may be separate from the robot 1300. For instance, the camera 1200 may be mounted to a ceiling of a warehouse or other structure and may remain stationary relative to the structure.

In an embodiment, the computing system 1100 of FIGS. 1A-1C may form or be integrated into the robot 1300, which may also be referred to as a robot controller. A robot control system may be included in the system 1500B, and is configured to e.g., generate commands for the robot 1300, such as a robot interaction movement command for controlling robot interaction between the robot 1300 and a container or other object. In such an embodiment, the computing system 1100 may be configured to generate such commands based on, e.g., image information generated by the camera 1200. For instance, the computing system 1100 may be configured to calculate a motion plan based on the image information, wherein the motion plan may be intended for, e.g., gripping or otherwise picking up an object. The computing system 1100 may generate one or more robot interaction movement commands to execute the motion plan.

In an embodiment, the computing system 1100 may form or be part of a vision system. The vision system may be a system which generates, e.g., vision information which describes an environment in which the robot 1300 is located, or, alternatively or in addition to, describes an environment in which the camera 1200 is located. The vision information may include the 3D image information and/or the 2D image information discussed above, or some other image information. In some scenarios, if the computing system 1100 forms a vision system, the vision system may be part of the robot control system discussed above or may be separate from the robot control system. If the vision system is separate from the robot control system, the vision system may be configured to output information describing the environment in which the robot 1300 is located. The information may be outputted to the robot control system, which may receive such information from the vision system and performs motion planning and/or generates robot interaction movement commands based on the information. Further information regarding the vision system is detailed below.

In an embodiment, the computing system 1100 may communicate with the camera 1200 and/or with the robot 1300 via a direct connection, such as a connection provided via a dedicated wired communication interface, such as a RS-232 interface, a universal serial bus (USB) interface, and/or via a local computer bus, such as a peripheral component interconnect (PCI) bus. In an embodiment, the computing system 1100 may communicate with the camera 1200 and/or with the robot 1300 via a network. The network may be any type and/or form of network, such as a personal area network (PAN), a local-area network (LAN), e.g., Intranet, a metropolitan area network (MAN), a wide area network (WAN), or the Internet. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol.

In an embodiment, the computing system 1100 may communicate information directly with the camera 1200 and/or with the robot 1300, or may communicate via an intermediate storage device, or more generally an intermediate non-transitory computer-readable medium. For example, FIG. 1D illustrates a system 1500C, which may be an embodiment of the system 1500/1500A/1500B, that includes a non-transitory computer-readable medium 1400, which may be external to the computing system 1100, and may act as an external buffer or repository for storing, e.g., image information generated by the camera 1200. In such an example, the computing system 1100 may retrieve or otherwise receive the image information from the non-transitory computer-readable medium 1400. Examples of the non-transitory computer readable medium 1400 include an electronic storage device, a magnetic storage device, an optical storage device, an electromagnetic storage device, a semiconductor storage device, or any suitable combination thereof. The non-transitory computer-readable medium may form, e.g., a computer diskette, a hard disk drive (HDD), a solid-state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), and/or a memory stick.

As stated above, the camera 1200 may be a 3D camera and/or a 2D camera. The 2D camera may be configured to generate a 2D image, such as a color image or a grayscale image. The 3D camera may be, e.g., a depth-sensing camera, such as a time-of-flight (TOF) camera or a structured light camera, or any other type of 3D camera. In some cases, the 2D camera and/or 3D camera may include an image sensor, such as a charge coupled devices (CCDs) sensor and/or complementary metal oxide semiconductors (CMOS) sensor. In an embodiment, the 3D camera may include lasers, a LIDAR device, an infrared device, a light/dark sensor, a motion sensor, a microwave detector, an ultrasonic detector, a RADAR detector, or any other device configured to capture depth information or other spatial structure information.

As stated above, the image information may be processed by the computing system 1100. In an embodiment, the computing system 1100 may include or be configured as a server (e.g., having one or more server blades, processors, etc.), a personal computer (e.g., a desktop computer, a laptop computer, etc.), a smartphone, a tablet computing device, and/or other any other computing system. In an embodiment, any or all of the functionality of the computing system 1100 may be performed as part of a cloud computing platform. The computing system 1100 may be a single computing device (e.g., a desktop computer), or may include multiple computing devices.

Figure 2A:
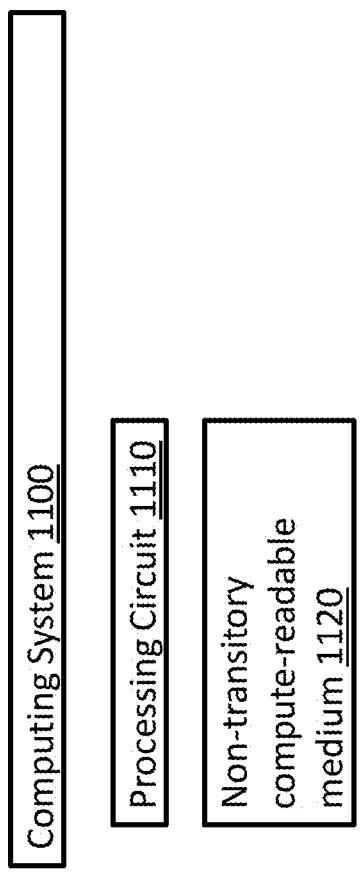
FIGS. 2A-2G provide block diagrams that illustrate a computing system configured to perform or facilitate defining a minimum viable region, consistent with embodiments hereof.

FIG. 2A provides a block diagram that illustrates an embodiment of the computing system 1100. The computing system 1100 in this embodiment includes at least one processing circuit 1110 and a non-transitory computer-readable medium (or media) 1120. In some instances, the processing circuit 1110 may include processors (e.g., central processing units (CPUs), special-purpose computers, and/or onboard servers) configured to execute instructions (e.g., software instructions) stored on the non-transitory computer-readable medium 1120 (e.g., computer memory). In some embodiments, the processors may be included in a separate/stand-alone controller that is operably coupled to the other electronic/electrical devices. The processors may implement the program instructions to control/interface with other devices, thereby causing the computing system 1100 to execute actions, tasks, and/or operations. In an embodiment, the processing circuit 1110 includes one or more processors, one or more processing cores, a programmable logic controller ("PLC"), an application specific integrated circuit ("ASIC"), a programmable gate array ("PGA"), a field programmable gate array ("FPGA"), any combination thereof, or any other processing circuit.

In an embodiment, the non-transitory computer-readable medium 1120, which is part of the computing system 1100, may be an alternative or addition to the intermediate non-transitory computer-readable medium 1400 discussed above. The non-transitory computer-readable medium 1120 may be a storage device, such as an electronic storage device, a magnetic storage device, an optical storage device, an electromagnetic storage device, a semiconductor storage device, or any suitable combination thereof, for example, such as a computer diskette, a hard disk drive (HDD), a solid state drive (SSD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, any combination thereof, or any other storage device. In some instances, the non-transitory computer-readable medium 1120 may include multiple storage devices. In certain implementations, the non-transitory computer-readable medium 1120 is configured to store image information generated by the camera 1200 and received by the computing system 1100. In some instances, the non-transitory computer-readable medium 1120 may store one or more model templates used for performing an object recognition operation. The non-transitory computer-readable medium 1120 may alternatively or additionally store computer readable program instructions that, when executed by the processing circuit 1110, causes the processing circuit 1110 to perform one or more methodologies described here.

Figure 2B:
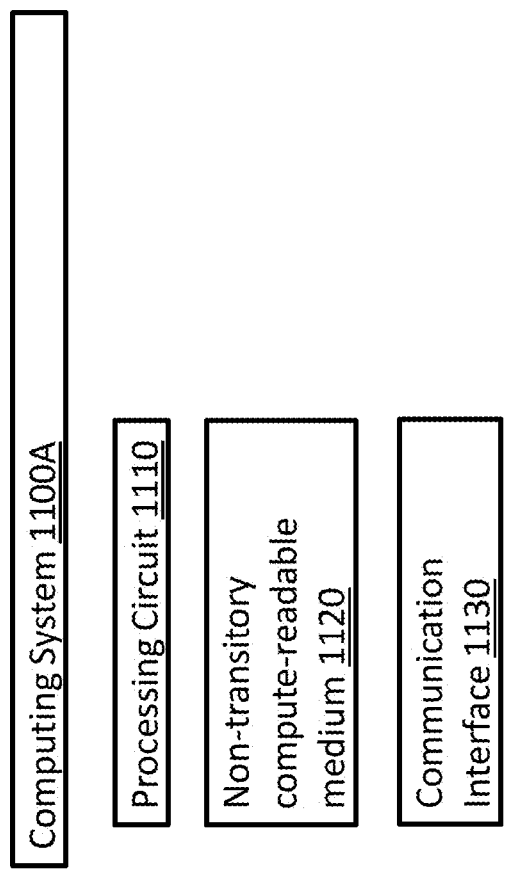

FIG. 2B depicts a computing system 1100A that is an embodiment of the computing system 1100 and includes a communication interface 1130. The communication interface 1130 may be configured to, e.g., receive image information generated by the camera 1200 of FIGS. 1A-1D. The image information may be received via the intermediate non-transitory computer-readable medium 1400 or the network discussed above, or via a more direct connection between the camera 1200 and the computing system 1100/1100A. In an embodiment, the communication interface 1130 may be configured to communicate with the robot 1300 of FIG. 1C. If the computing system 1100 is external to a robot control system, the communication interface 1130 of the computing system 1100 may be configured to communicate with the robot control system. The communication interface 1130 may also be referred to as a communication component or communication circuit, and may include, e.g., a communication circuit configured to perform communication over a wired or wireless protocol. As an example, the communication circuit may include a RS-232 port controller, a USB controller, an Ethernet controller, a Bluetooth® controller, a PCI bus controller, any other communication circuit, or a combination thereof.

Figure 2C:
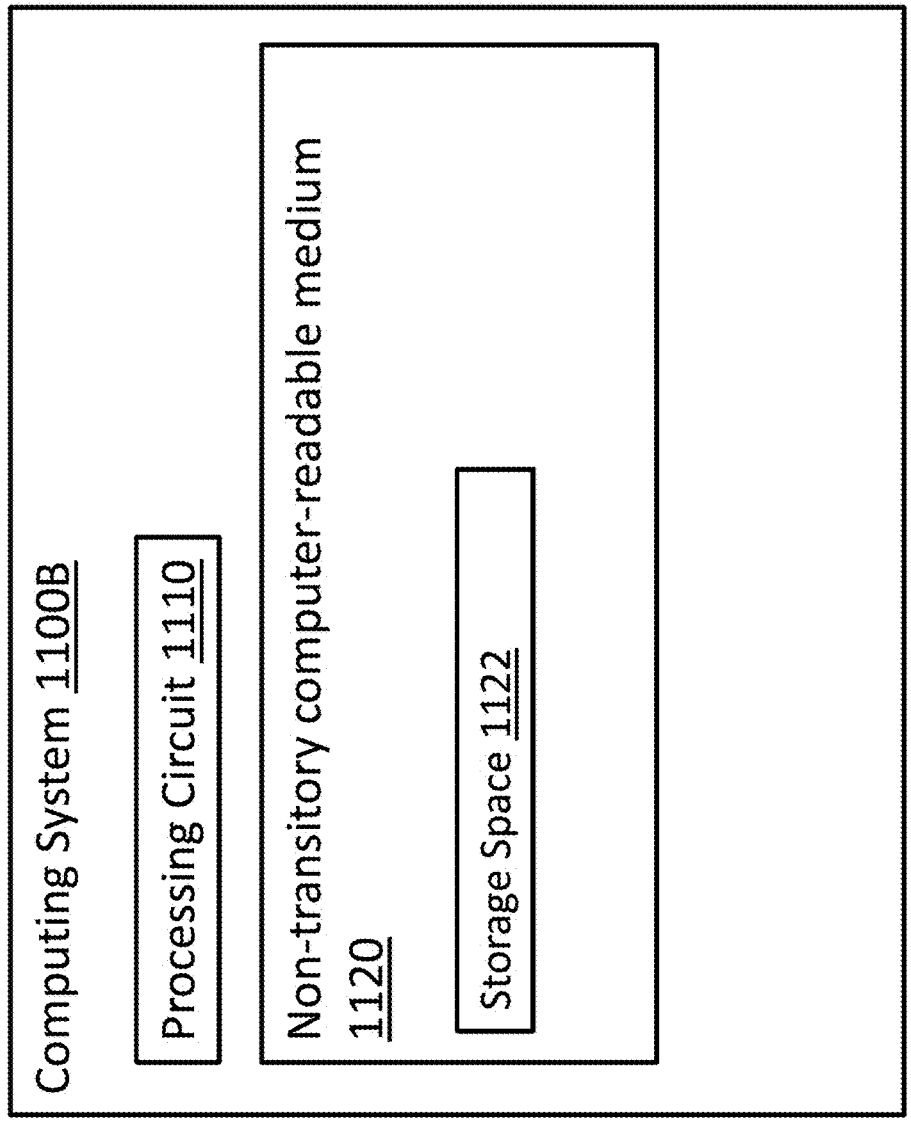

In an embodiment, as depicted in FIG. 2C, the non-transitory computer-readable medium 1120 may include a storage space 1122 configured to store one or more data objects discussed herein. For example, the storage space may store model templates, robotic arm move commands, and any additional data objects the computing system 1100B may require access to.

Figure 2D:
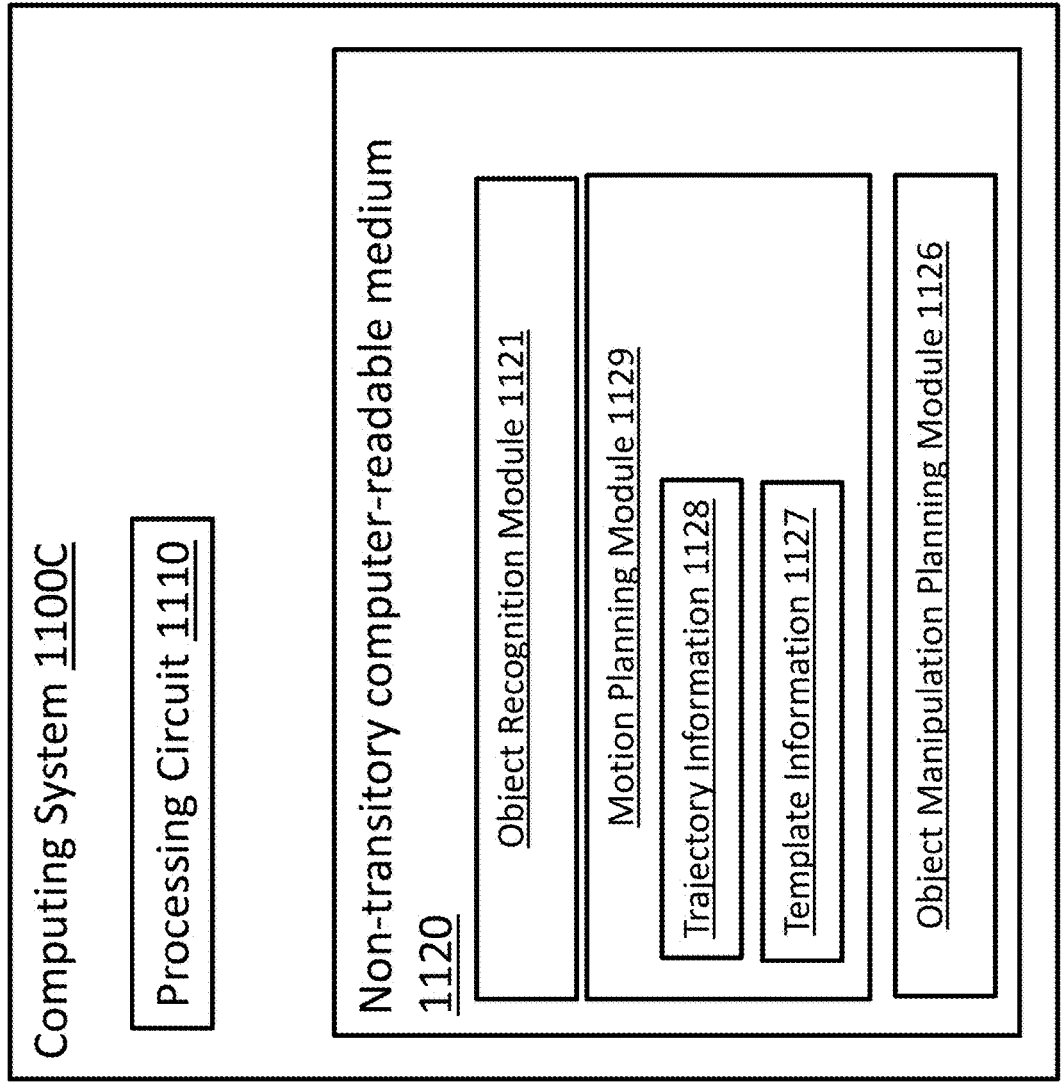

In an embodiment, the processing circuit 1110 may be programmed by one or more computer-readable program instructions stored on the non-transitory computer-readable medium 1120. For example, FIG. 2D illustrates a computing system 1100C, which is an embodiment of the computing system 1100/1100A/1100B, in which the processing circuit 1110 is programmed by one or more modules, including an object recognition module 1121, a motion planning module 1129, and an object manipulation module 1126. The motion planning module 1129 (and any other module associated with the computing system 1100C) may access trajectory information 1128 and template information 1127, as necessary.

In an embodiment, the object recognition module 1121 may be configured to obtain and analyze image information as discussed throughout the disclosure. Methods, systems, and techniques discussed herein with respect to image information may use the object recognition module 1121. The object recognition module may be used both for object recognition and for repository recognition, as discussed herein.

The motion planning module 1129 may be configured plan and execute the movement of a robot. For example, the motion planning module 1129 may derive individual placement locations/orientations, calculate corresponding motion plans, or a combination thereof for grabbing and moving objects. The motion planning module 1129 may access and update trajectory information 1128. Trajectory information 1128 may include pre-planned initial trajectory information accessible and updateable by the motion planning module 1129. The motion planning module may also store adjusted trajectory information. The motion planning module 1129 may access and update template information 1127, including object template information and repository template information (both source and destination), as discussed in greater detail below. Methods, systems, and techniques discussed herein with respect to robotic arm movements and trajectories may be performed by the motion planning module 1129. Methods, systems, and techniques discussed herein with respect models and templates may be performed by the motion planning module 1129.

The object manipulation module 1126 may be configured to plan and execute the object manipulation activities of a robotic arm, e.g., grasping and releasing objects and executing robotic arm commands to aid and facilitate such grasping and releasing.

Figure 2E:
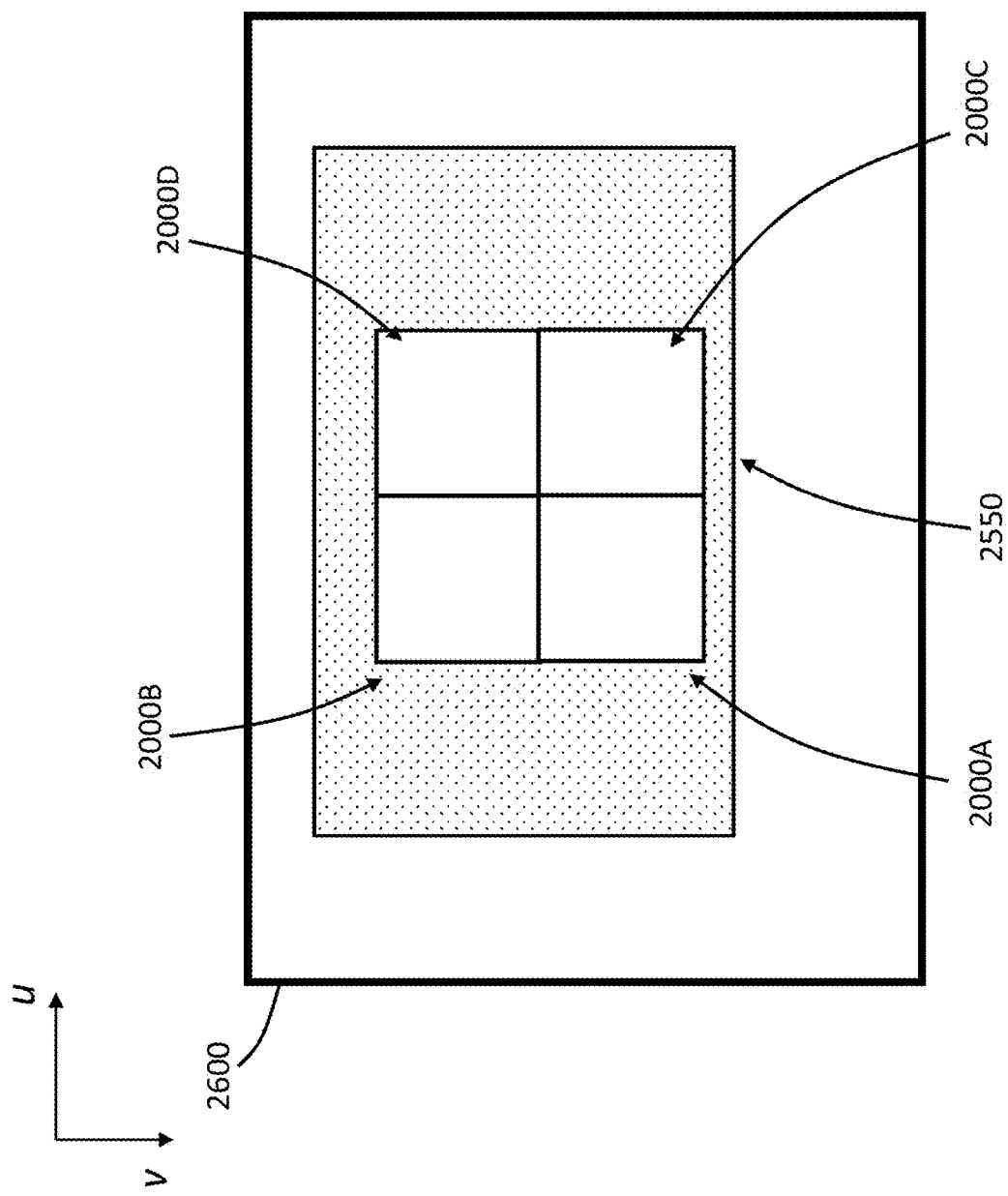
Figure 2F:
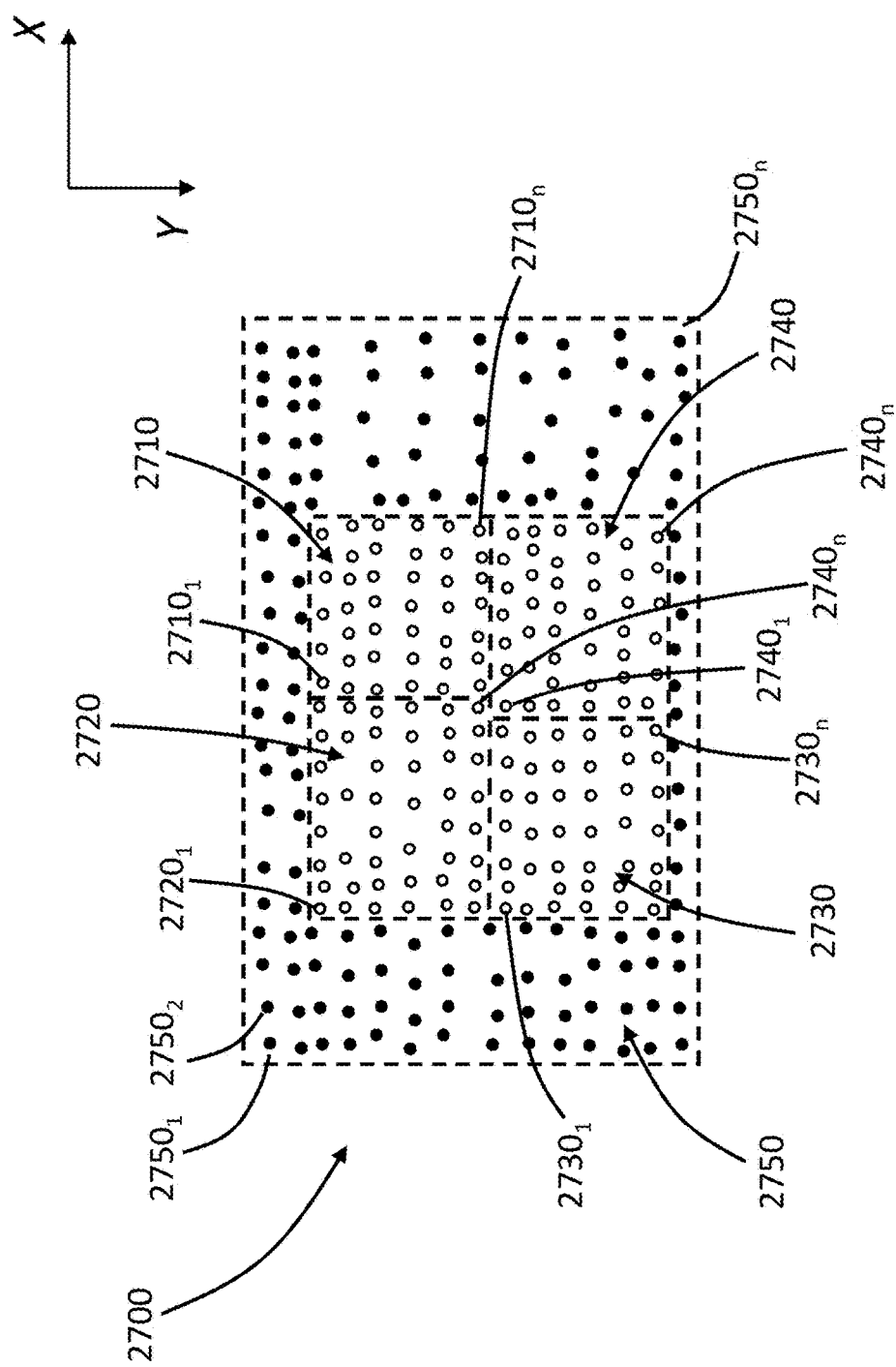
Figure 2G:
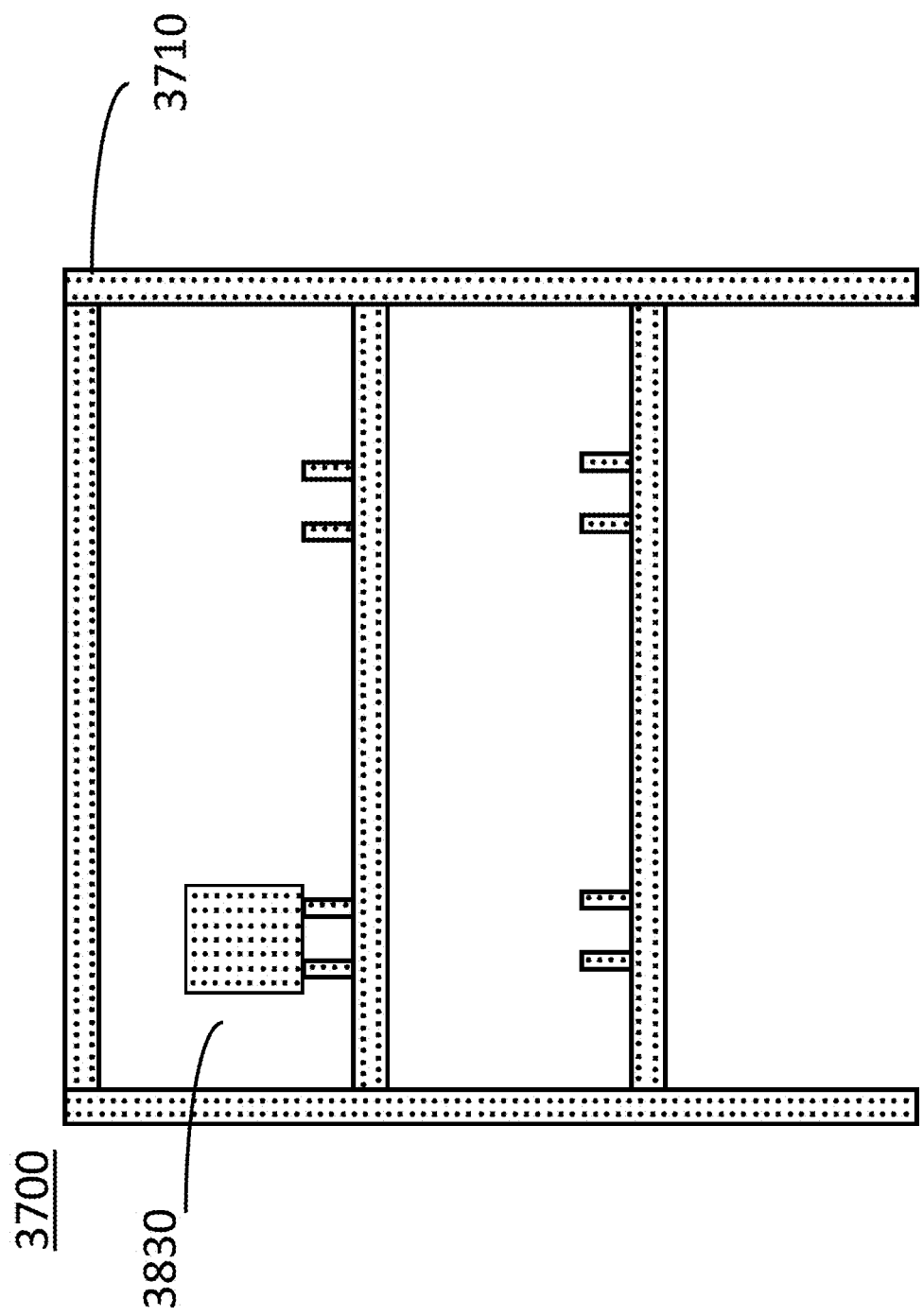
Figure 3A:
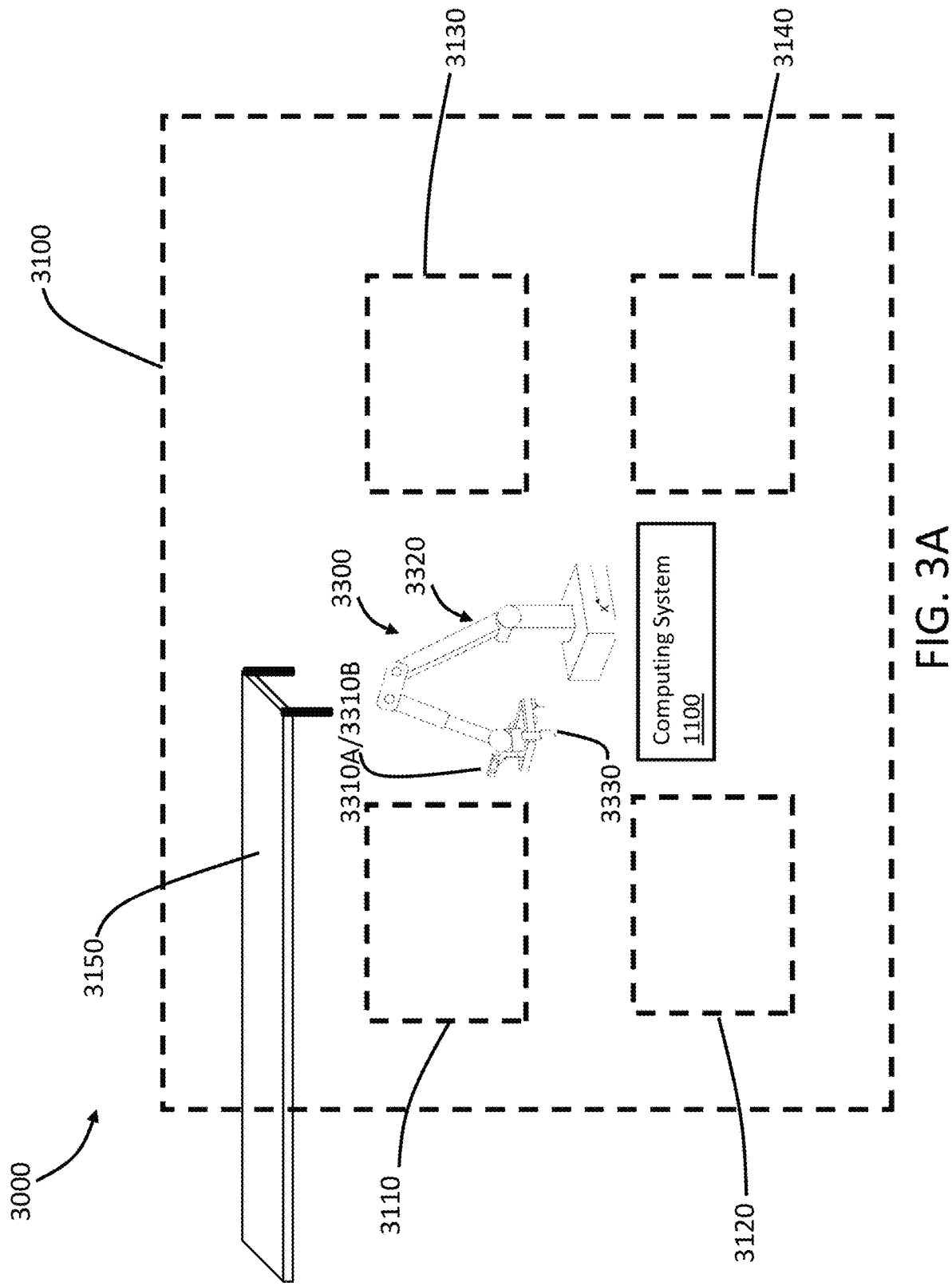

With reference to FIGS. 2E-2G, and 3A, methods related to the object recognition module 1121 that may be performed for image analysis are explained. FIGS. 2E and 2F illustrate example image information associated with image analysis methods while FIG. 3A illustrates an example robotic environment associated with image analysis methods. References herein related to image analysis by a computing system may be performed according to or using spatial structure information that may include depth information which describes respective depth value of various locations relative a chosen point. The depth information may be used to identify objects or estimate how objects are spatially arranged. In some instances, the spatial structure information may include or may be used to generate a point cloud that describes locations of one or more surfaces of an object. Spatial structure information is merely one form of possible image analysis and other forms known by one skilled in the art may be used in accordance with the methods described herein.

As an example, FIG. 2E depicts a first set of image information, or more specifically, 2D image information 2600, which, as stated above, is generated by the camera 3200 (illustrated in FIG. 3A) and may represent the objects 3530, 3520, 3510, and repositories 3110/3120/3130/3140/3150 of FIG. 3A. More specifically, the 2D image information 2600 may be a grayscale or color image and may describe an appearance of t the objects 3530, 3520, 3510, and repositories 3110/3120/3130/3140/3150 from a viewpoint of the camera 3200. In an embodiment, the 2D image information 2600 may correspond to a single-color channel (e.g., red, green, or blue color channel) of a color image. The 2D image information 2600 may represent an appearance of respective camera-facing surfaces of the objects 3530, 3520, 3510, and repositories 3110/3120/3130/3140/3150. In the example of FIG. 2E, the 2D image information 2600 may include respective portions 2000A/2000B/2000C/2000D/2550, also referred to as image portions, that represent respective surfaces of objects imaged by the camera 3200. For example, portions 2000A/2000B/2000C/2000D may represent objects such as boxes, while portion 2550 may represent a portion such as a pallet on which boxes are stacked or located. In FIG. 2E, each image portion 2000A/2000B/2000C/2000D/2550 of the 2D image information 2600 may be an image region, or more specifically a pixel region (if the image is formed by pixels). Each pixel in the pixel region of the 2D image information 2600 may be characterized as having a position that is described by a set of coordinates [U, V] and may have values that are relative to a camera coordinate system, or some other coordinate system, as shown in FIGS. 2E and 2F. Each of the pixels may also have an intensity value, such as a value between 0 and 255 or 0 and 1023. In further embodiments, each of the pixels may include any additional information associated with pixels in various formats (e.g., hue, saturation, intensity, CMYK, RGB, etc.)

As stated above, the image information may in some embodiments be all or a portion of an image, such as the 2D image information 2600. In examples, the computing system 1100 may be configured to extract an image portion 2000A from the 2D image information 2600 to obtain only the image information associated with a corresponding object. For instance, the computing system 1100 may extract the image portion 2000A by performing an image segmentation operation based on the 2D image information 2600 and/or 3D image information 2700 illustrated in FIG. 2F. In some implementations, the image segmentation operation may include detecting image locations at which physical edges of objects appear (e.g., edges of a box) in the 2D image information 2600 and using such image locations to identify an image portion (e.g., 5610) that is limited to representing an individual object in a camera field of view (e.g., 3210).

FIG. 2F depicts an example in which the image information is 3D image information 2700. More particularly, the 3D image information 2700 may include, e.g., a depth map or a point cloud that indicates respective depth values of various locations on one or more surfaces (e.g., top surface or other outer surface) of the imaged objects/repositories. In some implementations, an image segmentation operation for extracting image information may involve detecting image locations at which physical edges of objects appear (e.g., edges of a box) in the 3D image information 2700 and using such image locations to identify an image portion (e.g., 2730) that is limited to representing an individual object in a camera field of view (e.g., 3000A).

The respective depth values may be relative to the camera 3200 which generates the 3D image information 2700 or may be relative to some other reference point. In some embodiments, the 3D image information 2700 may include a point cloud which includes respective coordinates for various locations on structures of objects in the camera field of view (e.g., 3210). In the example of FIG. 2F, the point cloud may include respective sets of coordinates that describe the location of the respective surfaces of the imaged objects/repositories. The coordinates may be 3D coordinates, such as [X Y Z] coordinates, and may have values that are relative to a camera coordinate system, or some other coordinate system. For instance, the 3D image information 2700 may include a first portion 2710, also referred to as an image portion, that indicates respective depth values for a set of locations $2710_1$-$2710_n$, which are also referred to as physical locations on a surface of the corresponding object (2000D). Further, the 3D image information 2700 may further include a second, a third, and a fourth portion 2720, 2730, and 2740. These portions may then further indicate respective depth values for a set of locations, which may be represented by $2720_1$-$2720_n$, $2730_1$-$2730_n$, and $2740_1$-$2740_n$, respectively, corresponding to objects 2000B, 2000A, and 2000C, respectively. A fifth portion 2750, including locations $2750_1$-$2750_n$, may correspond to object 2550. These figures are merely examples, and any number of objects with corresponding image portions may be used. Similarly to as stated above, the 3D image information 2700 obtained may in some instances be a portion of a first set of 3D image information 2700 generated by the camera. In the example of FIG. 2E, if the 3D image information 2700 obtained represents a first object, then the 3D image information 2700 may be narrowed as to refer to only the image portion 2710.

FIG. 2G illustrates an example 3D image information 3700 of an object repository. The 3D image information 3700 may include a point cloud with a first image portion 3710 representative of the repository and a second image portion 3830 representative of an object situated in the repository. FIG. 2G is by way of example only, and repositories/objects consistent with embodiments hereof may take many form. In FIG. 2G, the 3D image information is captured in a "head-on" view, with the camera 3200 having been positioned directly in front of the repository without a significant angle.

In embodiments, an image normalization operation may be performed by the computing system 1100 as part of obtaining the image information. The image normalization operation may involve transforming an image or an image portion generated by the camera 3200, so as to generate a transformed image or transformed image portion. For example, if the image information, which may include the 2D image information 2600, the 3D image information 2700, or a combination of the two, obtained may undergo an image normalization operation to attempt to cause the image information to be altered in viewpoint, object pose, and lighting condition. Such normalizations may be performed to facilitate a more accurate comparison between the image information and model (e.g., template) information, as discussed in greater detail below. The viewpoint may refer to a pose of an object relative to the camera 3200, and/or an angle at which the camera 3200 is viewing the object when the camera 3200 generates an image representing the object.

For example, the image information may be generated during an object recognition operation in which the target repository or object is in the camera field of view. The camera 3200 may generate image information that represents the target repository or object when the target repository or object has a specific pose relative to the camera. For instance, the target repository or object may have a pose which causes a side surface to be perpendicular to an optical axis of the camera 3200. In such an example, the image information generated by the camera 3200 may represent a specific viewpoint, such as a side or head on view of the target object. In some instances, an optical axis of the camera may be configured at an angle to the target repository or object. In such instances, the viewpoint may be an angled or oblique viewpoint. In some instances, when the camera 3200 is generating the image information during the object recognition operation, the image information may be generated with a particular lighting condition, such as a lighting intensity. In such instances, the image information may represent a particular lighting intensity, lighting color, or other lighting condition.

In an embodiment, the image normalization operation may involve adjusting an image or an image portion of a scene generated by the camera, so as to cause the image or image portion to better match a viewpoint and/or lighting condition associated with information of a model template. The adjustment may involve transforming the image or image portion to generate a transformed image which matches at least one of an object pose or a lighting condition associated with the visual description information of the model template.

The viewpoint adjustment may involve processing, warping, and/or shifting of the image of the scene so that the image represents the same viewpoint as the description information in a model template. Processing, for example, includes altering the color, contrast, or lighting of the image, warping of the scene may include changing the size, dimensions, or proportions of the image, and shifting of the image may include changing the position, orientation, or rotation of the image. In an example embodiment, processing, warping, and or/shifting may be used to alter an object in the image of the scene to have an orientation and/or a size which matches or better corresponds to the visual description information of the model template. If the model template describes a head-on view (e.g., side view) of some object, the image of the scene may be warped so as to also represent a head-on view of an object in the scene.

In various embodiments, the terms "computer-readable instructions" and "computer-readable program instructions" are used to describe software instructions or computer code configured to carry out various tasks and operations. In various embodiments, the term "module" refers broadly to a collection of software instructions or code configured to cause the processing circuit 1110 to perform one or more functional tasks. The modules and computer-readable instructions may be described as performing various operations or tasks when a processing circuit or other hardware component is executing the modules or computer-readable instructions.

Aspects of the present disclosure are related to pick and place operations of a robotic arm within a loading/unloading (transfer) zone. A robotic arm may be configured to grasp an object (e.g., a box, container, etc.) from a source repository and move the object to a destination repository. In embodiments, the transfer operations may be aided by image analysis and trajectory planning. In embodiments, the image analysis may be aided by model template comparisons.

In various embodiments, the terms "computer-readable instructions" and "computer-readable program instructions" are used to describe software instructions or computer code configured to carry out various tasks and operations. In various embodiments, the term "module" refers broadly to a collection of software instructions or code configured to cause the processing circuit 1110 to perform one or more functional tasks. The modules and computer-readable instructions may be described as performing various operations or tasks when a processing circuit or other hardware component is executing the modules or computer-readable instructions.

FIGS. 3A-3F illustrate an example environment in which robotic trajectory planning and execution may be used.

FIG. 3A depicts an environment having a system 3000 (which may be an embodiment of the system 1000/1000A/1000B/1000C of FIGS. 1A-1D) that includes the computing system 1100 and a robot 3300. The robot 3300 may include a robotic arm 3320, an end effector apparatus 3330, and one or more cameras (or optical recognition devices) 3310A/3310B. The end effector apparatus may include various robotic tools, such as grippers, suction cups, claws, graspers, etc., configured for object interaction. The cameras 3310A/3310B may be embodiments of the camera 1200, and may be configured to generate image information which represents a scene in a camera field of view. The system 3000 may be configured to operate in an object transfer area 3100, arranged to facilitate the transfer of objects between repositories, such as repositories 3110, 3120, 3130, 3140, and 3150. The system 3000 is configured to plan, facilitate, and/or perform the transfer of objects (e.g., boxes, bins, manufacturing components, parts, and/or other physical items) between repositories in the object transfer area 3100.

As shown in FIG. 3A, a conveyor-type source repository 3150 may bring objects to the object transfer area 3100, having one or more destination repositories 3110-3140, which may be shelf-type repositories, bin-type repositories, or any other suitable repository, that may be used for, e.g., organizing or temporarily storing the objects. Examples of shelf-type repositories are shown in FIG. 3B, FIG. 3C, FIG. 3E, and FIG. 3F. For example, the one or more shelves may include a storage shelf, a manufacturing shelf, etc. In an embodiment, a shelf in the shelf area may be movable into or out of the shelf area. For instance, the shelf may be lifted and transported into the shelf area by an automated guided vehicle (AGV) 3900, as illustrated, e.g., in FIGS. 3C and 3E. As discussed in detail below, the system 3000 may include a robot 3300 configured for placing an object into or onto a destination repository, wherein the object may be retrieved by the robot 3300 from a source repository, such as the conveyor or another shelf. In some scenarios, the objects on the conveyor-type repository 3150 may arrive from a different object transfer area, e.g., a de-palletization area 3100A, as shown, e.g., in FIG. 3D. In the de-palletization area, another robot or computing system consistent with embodiments herein may pick up objects from a pallet (e.g., source repository) and place the object on the conveyor (e.g., destination repository). Thus, the same physical structure may serve as both a source repository and a destination repository, depending on the context.

Figure 3B:
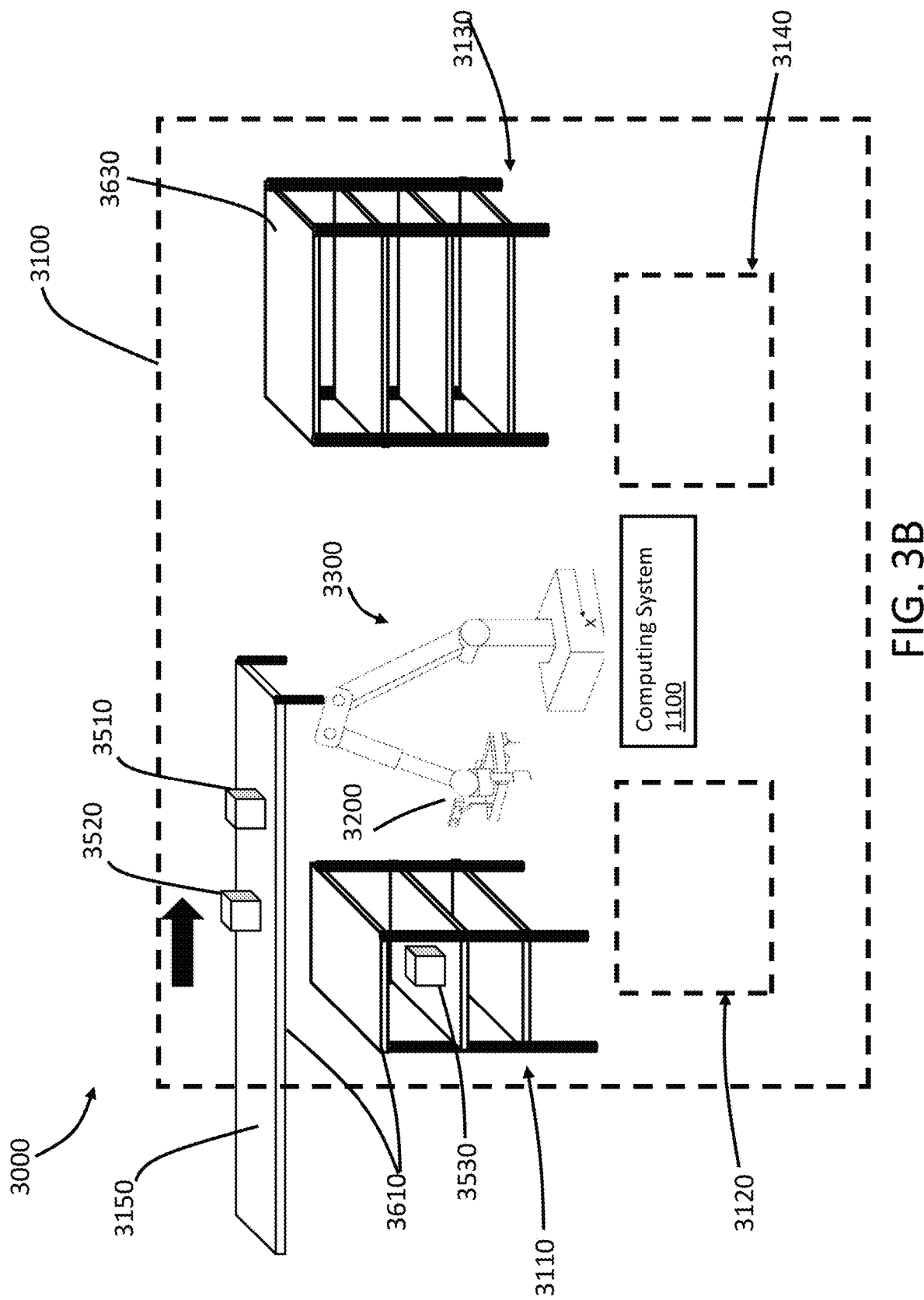

FIG. 3B illustrates further aspects of an environment in which the system 3000 may operate. As shown in FIG. 3B, the object transfer area 3100 may include a conveyor-type repository 3150, e.g., as a source repository, one or more shelf-type repositories 3110 and 3130, and one or more bin-type repositories 3120 and 3140. Objects 3520 and 3510 may arrive in the object transfer area 3100 via the repository 3150. In an embodiment, the repository 3110 (storing object 3530) and the repository 3150 may each function as a source repository 3610 while the repository 3130 functions as a destination repository 3630. In further embodiments, each of these repositories may function as either a source or destination repository or both, depending on the object transfer context. A repository may function as a destination repository to receive some objects and also function as a source repository whereby those same objects may be retrieved and moved to a new repository at a later time.

Figure 3C:
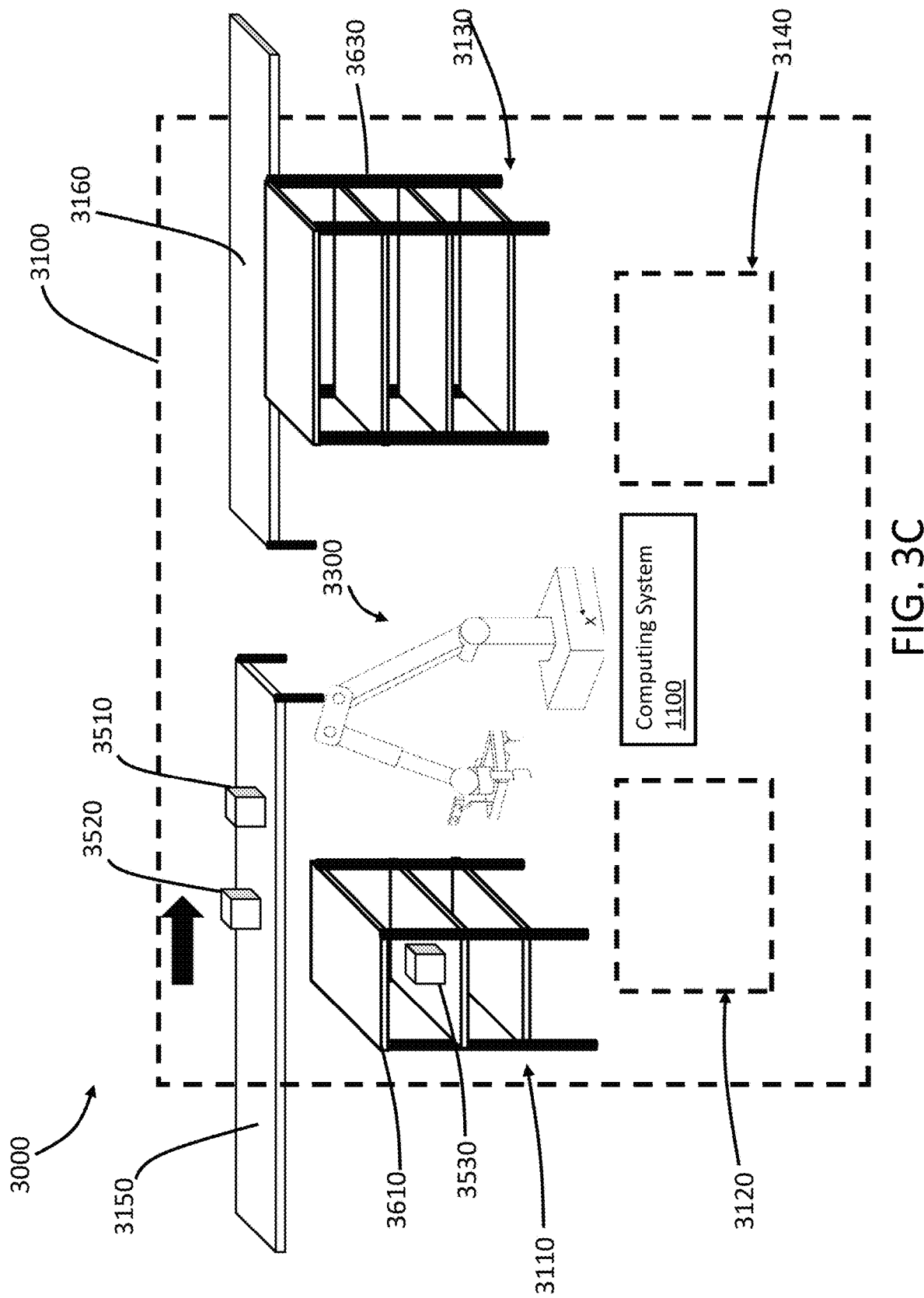

FIG. 3C illustrates further aspects of an environment in which the system 3000 may operate. FIG. 3C illustrates an object transfer area 3100 including two conveyor-type repositories 3150 and 3160. In embodiments, a first conveyor-type repository 3150 may function as a source repository while a second conveyor-type repository 3160 may function as a destination repository.

Figure 3D:
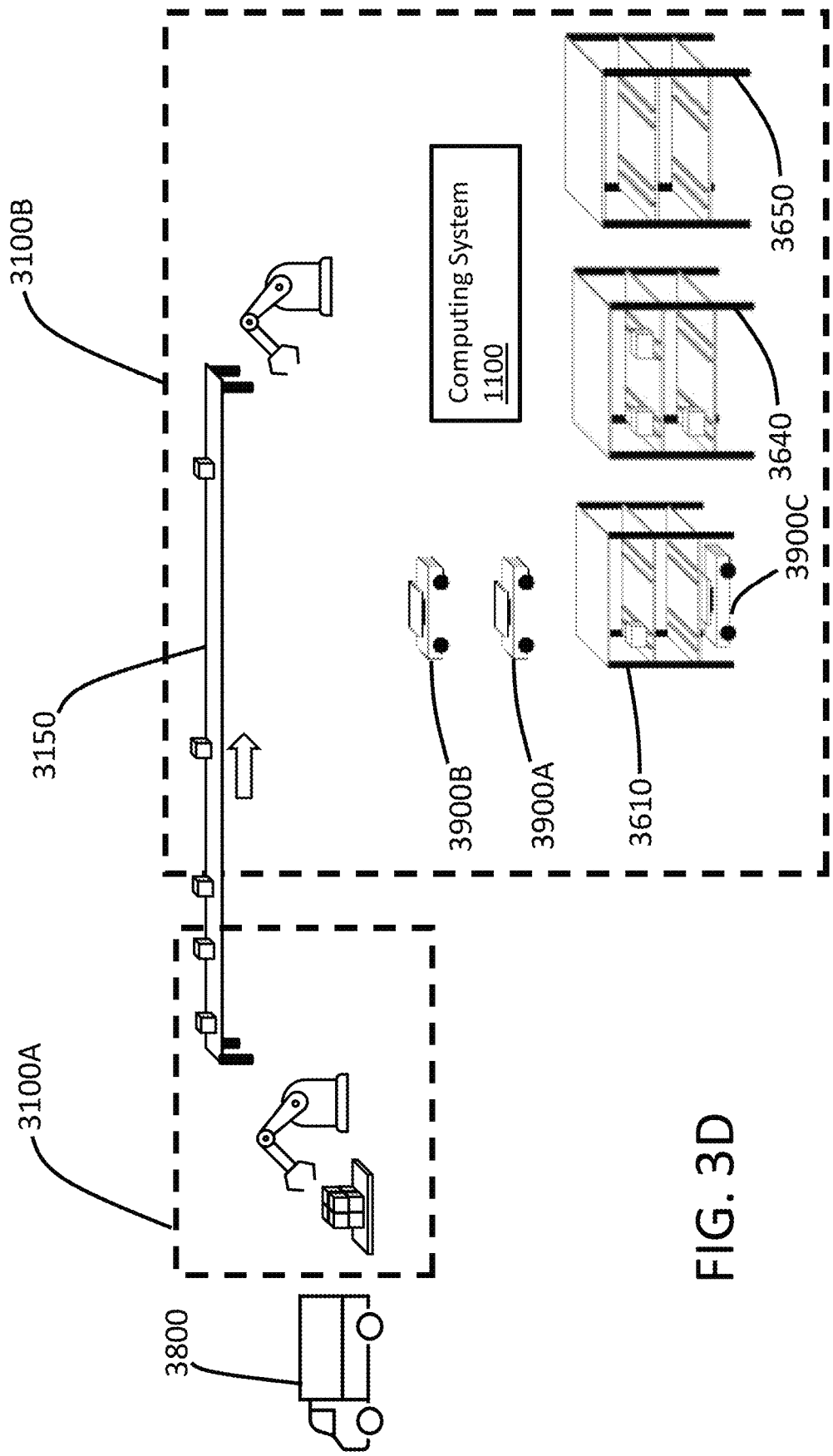

FIG. 3D illustrates further aspects of an environment in which the system 3000 may operate. FIG. 3D illustrates multiple object transfer areas 3100A and 3100B, served with a connection between them by the conveyor-type repository 3150. The conveyor-type repository 3150 may function as a destination repository for object transfer area 3100A and a source repository for object transfer area 3100B. Objects may be delivered to object transfer area 3100A, for example, by means of a delivery truck 3800 or other vehicle or transport method (train, shipping container, etc.) Thus, the robot 3300A may operate to perform a depalletization process, for example, and transfer objects to the conveyor-type repository 3150 as a destination repository. The robot 3300B may operate to transfer objects from the object transfer area 3100B. FIG. 3D further illustrates multiple autonomous ground vehicles (AGVs) 3900A/B/C. The multiple autonomous ground vehicles (AGVs) 3900A/B/C may be configured to transport one or more of the shelf-type repositories 3610, 3640, 3650, permitting them to be transferred between one object transfer area and another.

FIG. 3E illustrates further aspects of an environment in which the system 3000 may operate. Specifically, FIG. 3E illustrates a shelf-type repository 3110 containing an object 3530 positioned for transfer by the AGV 3900A.

Figure 3F:
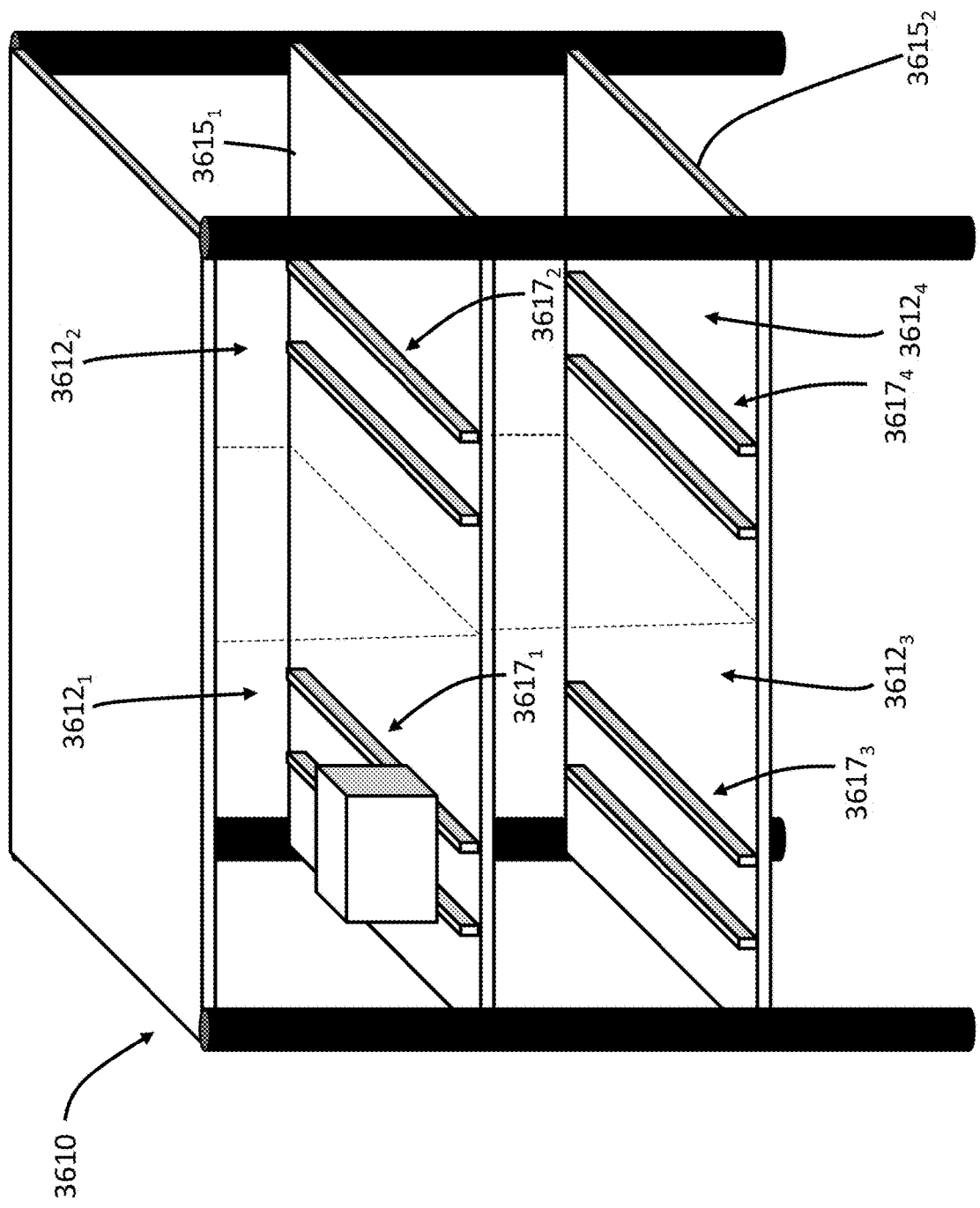

FIG. 3F illustrates further aspects of an environment in which the system 3000 may operate. Specifically, FIG. 3E illustrates a shelf-type repository 3110 divided into multiple repository shelves $3615_1$, $3615_2$. The repository shelves 3615 may each have a housing divided into multiple repository compartments or cells $3612_1$, $3612_2$, $3612_3$, and $3612_4$. In the shelf-type repository 3110, each repository cell 3612 includes one or more cell rails $3617_{1-4}$. In embodiments, the compartments or cells 3612 may be defined by the rails $3617_{1-4}$.

The present disclosure relates to performing, facilitating, and/or planning the transfer of an object from a source repository to a destination repository. FIG. 4 depicts a flow diagram for an example method 4000 for performing, facilitating, and/or planning the transfer of an object from a source repository to a destination repository.

In an embodiment, the method 4000 may be performed by, e.g., the computing system 1100 of FIGS. 2A-2D or of FIG. 3A or 3C, or more specifically by the at least one processing circuit 1110 of the computing system 1100. In some scenarios, the at least one processing circuit 1100 may perform the method 4000 by executing instructions stored on a non-transitory computer-readable medium (e.g., 1120). For instance, the instructions may cause the processing circuit 1110 to execute one or more of the modules illustrated in FIG. 2D, which may perform method 4000. For example, in embodiments, steps related to object/repository recognition, e.g., operations 4004, 4006, and others, may be performed by an object recognition module 1121. For example, in embodiments, steps related to motion and trajectory planning, e.g., operations 4002, 4008, 4012, and others, may be performed by a motion planning module 1129. For example, in embodiments, steps related to object placement and handling, e.g., operations 4010, 4014, and others, may be performed by object manipulation planning module 1126. In some embodiments, motion planning module 1129 and object manipulation planning module 1126 may operate in concert to define and/or plan trajectories that involve both motion and object manipulation.

The steps of the method 4000 may be employed to achieve specific sequential robot trajectories for performing specific tasks. As a general overview, the method 4000 may operate to cause the system 3000 to transfer objects from a source repository to a destination repository. Such a transfer operation may include operation of the robot 3300 according to a pre-planned trajectory that is updated and/or refined according to various operations occurring during the operation.

For example, the robotic system may generate a pre-planned trajectory. The pre-planned trajectory may be generated independently of a repository detection operation (described below) or any other operation that utilizes image information. Accordingly, even without image information, the computing system 3000 may have sufficient information, regarding the likely position of a shelf, conveyor, or other source or destination repository, to generate at least an initial, pre-planned trajectory. Although, in some cases, the pre-planned trajectory may not be accurate enough to ensure that the end effector apparatus will be able to correctly retrieve an object from a particular cell of the shelf and/or place an object into the particular cell, the rough trajectory may be sufficient to allow the end effector apparatus to approach the shelf.

The pre-planned trajectory may lack sufficient accuracy for a variety of reasons. In some examples, in the case of shelf repositories, the computing system may lack information regarding which shelves and cells are currently occupied. In another example, in the case of a mobile shelf repository that is transported by an AGV 3900, the AGV 3900 may fail to locate the shelf in the exact position that is expected. In another example, in the case of a mobile shelf repository that is transported by an AGV 3900, different inflation amounts of AGV 3900 tires may result in a shelf repository at a different-than-expected height or a shelf repository at an angle. In other examples, e.g., with respect to conveyor type repositories, objects may come to rest at different places or in different orientation/pose/postures/heights/positions. Each of these examples, which are not exhaustive, represent situations in which an object source or destination is positioned close to but not in precisely an expected location. Accordingly, it is advantageous to use a pre-planned trajectory to approach the source/destination and an altered trajectory (e.g., modified based on object recognition operations) to complete an object pick-up or object placement operation.

The pre-planned trajectory may be adjusted based on a result of repository detection operations and object detection operations, where the adjusted trajectory is accurate enough to ensure that the end effector apparatus will be able to correctly retrieve an object from a particular cell of the shelf and/or place an object into the particular cell. The robotic system may use image information to perform the repository detection operation, which is discussed below in more detail. The repository detection operation may involve positioning a camera, which may be attached to the robot arm, in front of a shelf, and generating image information representing at least a portion of the shelf. The repository detection operation may use the image information to determine more accurate information regarding a shelf, and this information may be used to control movement of a robot for interacting with the shelf. In embodiments, the repository detection operation may also use image information captured by cameras not disposed on the robot arm performing the object placement, e.g., stationary cameras located throughout a transfer area and/or mobile cameras located on separate and different robotic arms.

The process of generating the initial pre-planned trajectory and then adjusting a portion of the pre-planned trajectory provides a technical advantage of improving a start time of robot processing, improving reliability and accuracy of pick/place operations, and reducing an amount of computation involved in controlling movement of the robot. For instance, the use of the pre-planned trajectory may allow robot movement to begin earlier (e.g., to move to a position for repository detection), which may allow robot processing of objects from the source repository to begin earlier. Further, while a portion of the trajectory may be adjusted based on a result of the repository detection operation, the remaining portion of the rough trajectory may remain unchanged. This remaining portion may thus be reused for placing further objects from a source repository. The reuse of this portion of the pre-planned trajectory may reduce a total amount of computation involved in a robot processing operation, such as removing objects from the source repository and placing them onto one or more destination repositories.

In the method 4000, a robotic system may be configured and operated to control movement of a robot to retrieve an object from a particular source repository and/or to place an object into a particular destination repository. The robotic system may be configured to adjust a pre-planned or predictive trajectory of the robot, or more specifically a pre-planned or predictive trajectory of an end effector apparatus, wherein the adjusted trajectory improves an accuracy and reliability by which the end effector apparatus picks up an object from a repository and/or place the object on/in a repository. The adjustment of the pre-planned trajectory may be based on performing repository/object detection, which may involve using image information to more accurately determine a structure of the repository, a position of the repository, and/or a position of an object on the repository.

In an embodiment, a predictive trajectory causes a robot to move between a source and a destination, for picking up an object from the source and to deliver the object to the destination. In an embodiment, the predictive trajectory may be used as part of the movement. In embodiments, the system 3000 may include the ability to execute multiple different predictive trajectories. Movement of a robot 3300 in a predictive trajectory may be referred to herein as a movement cycle.

The description of method 4000 refers to Movement Cycle A and Movement Cycle B. The movement in these cycles may include movement for also position a camera (e.g., on-hand camera attached to robotic arm or other camera) in front of a repository, so that the camera can generate image information representing the repository, wherein the image information is used for the repository/object detection operation.

Figure 5A:
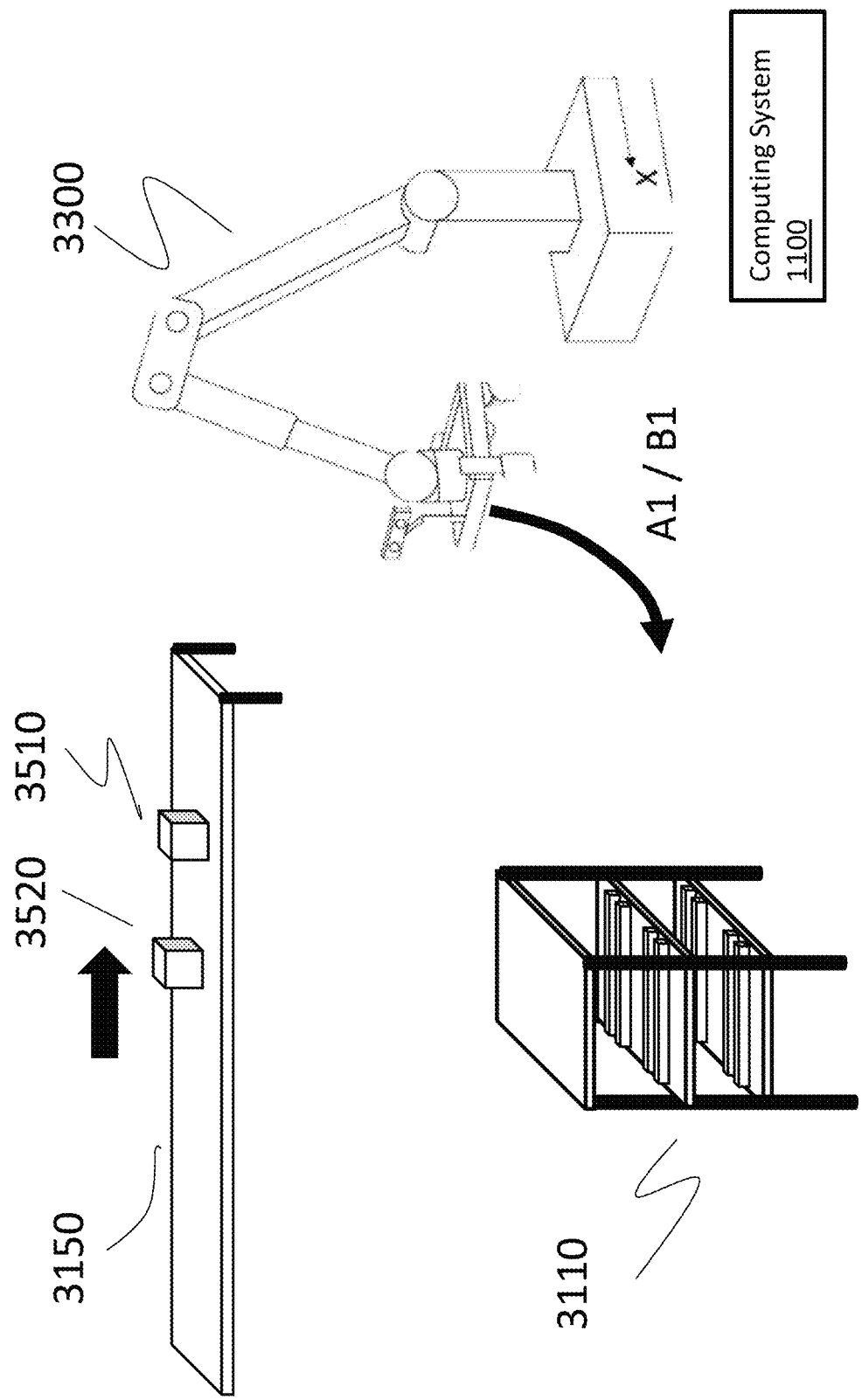
FIGS. 5A-5C illustrate motion planning trajectories of a robotic arm consistent with embodiments hereof.
Figure 5B:
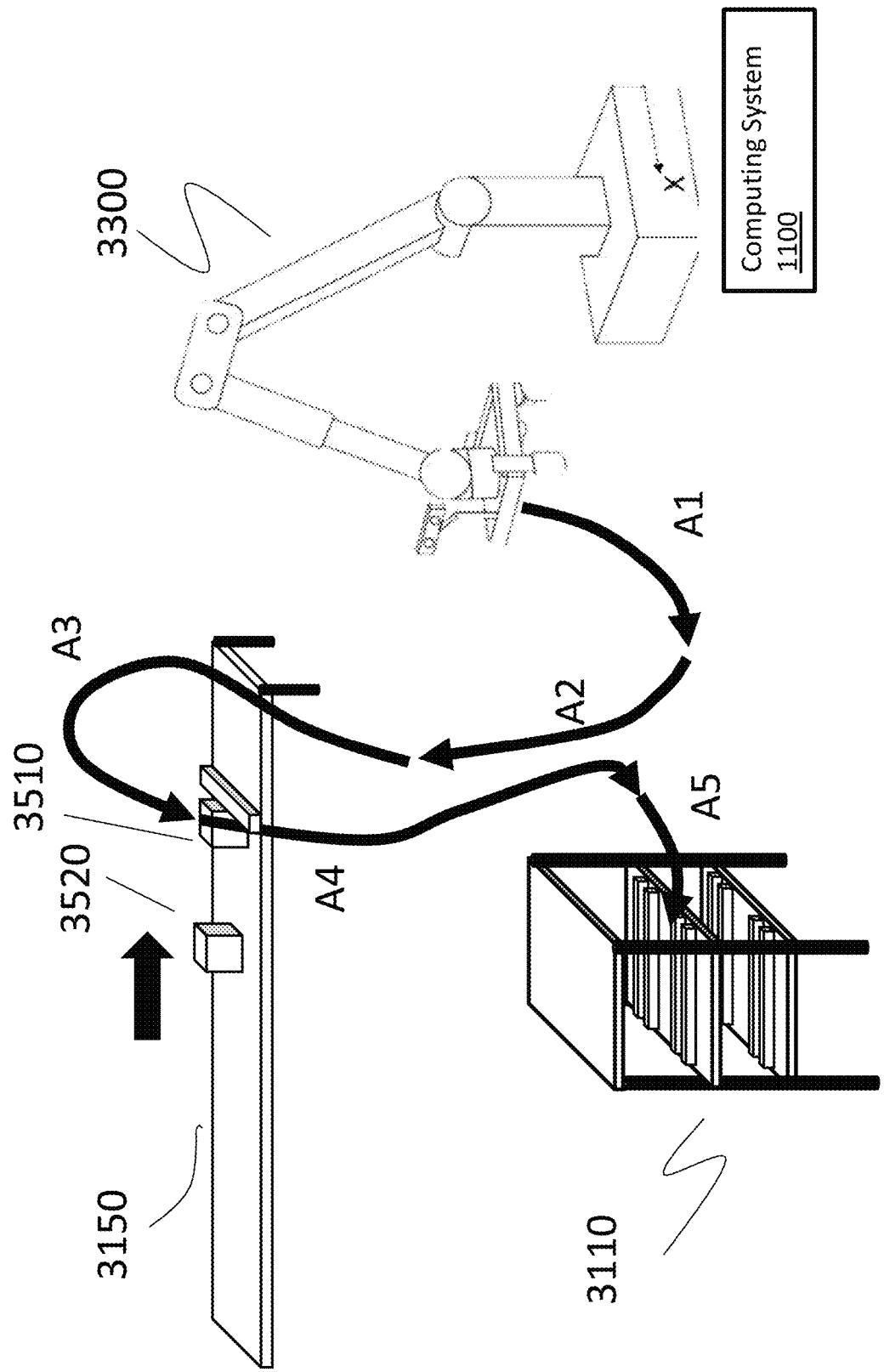

In one type of movement cycle, referred to as Cycle A, depicted in FIGS. 5A and 5B. the robot 3300 in the object transfer area 3100 may retrieve an object from a fixed source repository (e.g., a conveyor) and place it on a type of destination repository. In Movement Cycle A, the source repository, which is fixed, does not require a repository detection operation.

Figure 5C:
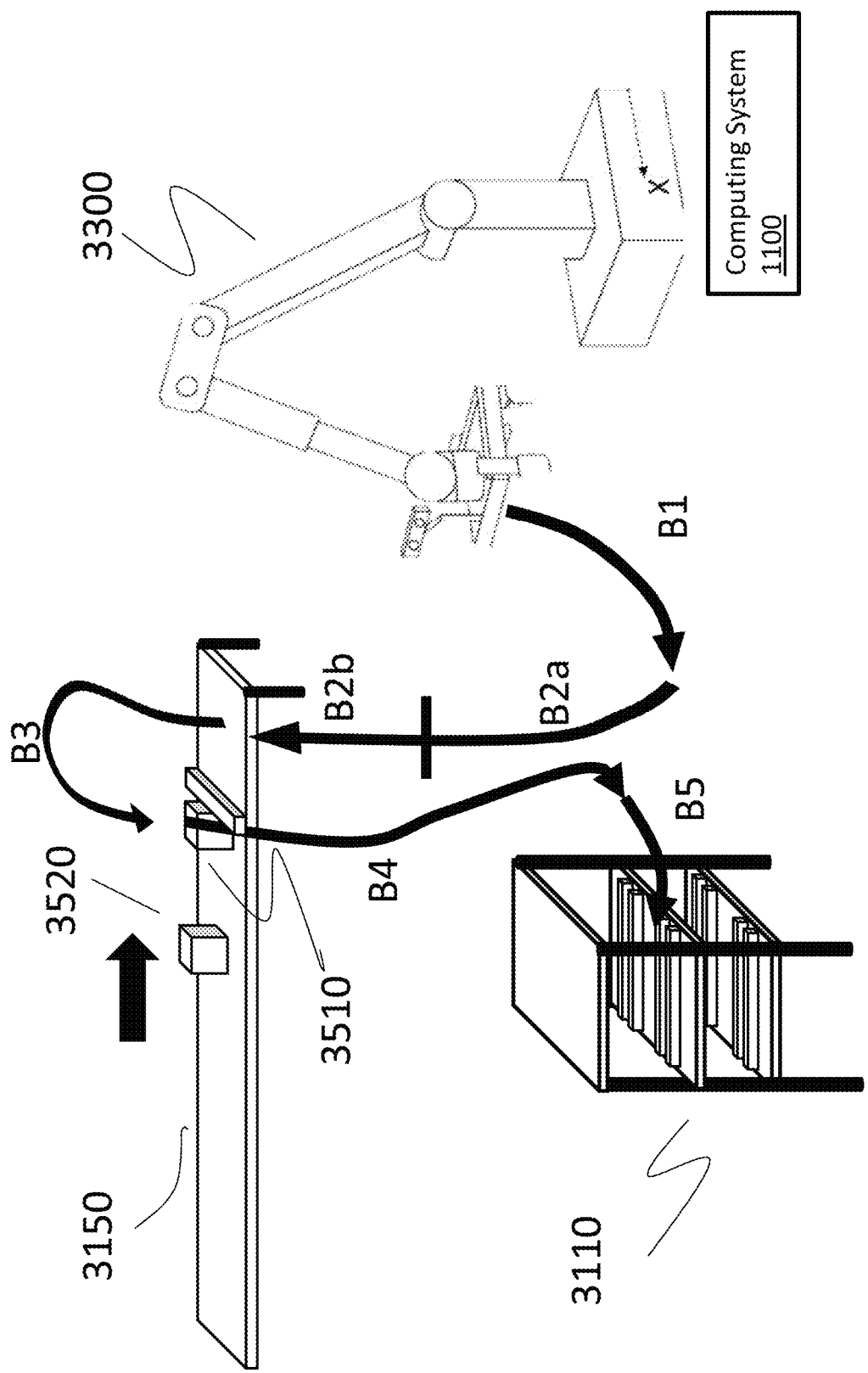

In another type of movement cycle, referred to as Cycle B, depicted in FIGS. 5A and 5C, the robot 3300 may retrieve an object from a mobile source repository (e.g. a moveable shelf), and move the object to a shelf type destination repository. Accordingly, movement Cycle B may include additional commands to refine a robot trajectory with respect to the mobile source repository.

Movement Cycles A and B are provided by way of example only. The robot may be controlled to have other movement cycles that involve moving an object between other repositories functioning as sources or destinations. For example, a conveyor-type destination repository may lead to a rejection area or another object transfer area. The rejection area may be used as an area to temporarily store rejected objects, such as objects which are damaged or are not recognized by the computing system. For instance, the robot may move such an object to the conveyor type destination repository directly from a conveyor type source repository, or from another shelf type source repository. In some instances, some or all of the shelves may be moved into the shelf area or out of the shelf area by one or more AGV's.

The description of Movement Cycles A and B should be understood as descriptive of operations that involve repository/object detection operations that may be used to refine, adjust, and otherwise modify pre-planned trajectories or create new trajectories. Movement cycles that require different combinations of source and destination repositories may require different combinations and/or different ordering of the operations disclosed herein without departing from the scope of this disclosure.

The method 4000 is described below with specific respect to both Movement cycle A and Movement cycle B. As described below, Movement cycle A (as shown in FIG. 5B) and Movement cycle B (as shown in FIG. 5C) may share a number of similar operations. In the below discussion, operations that may be specific to one or the other movement cycle are explained as such. However, the steps, processes, and operations of the method 4000 may be equally applied to other movement cycles. The method 4000 may be carried out via a computing system comprising a communication interface configured to communicate with a robot having a robot arm that includes or is attached to an end effector apparatus, and having a camera attached to the robot arm. The computing system may further include, as discussed herein, at least one processing circuit configured, when the robot is in an object transfer region that includes a source repository (e.g., conveyor or first shelf) and a destination repository (e.g., a second shelf, a bin, etc.), to perform the method steps for transferring an object from the source repository to the destination repository.

The method 4000 may begin with or otherwise include an operation 4002, in which the computing system (or processing circuit thereof) is configured to output a first destination repository approach command for causing the robot arm to approach a destination repository in a manner that causes the camera to be pointed at the destination repository. As illustrated in FIGS. 5A, 5B, and 5C, the computing system outputs a first destination repository approach command that causes the robot arm, e.g., via a destination repository approach trajectory, e.g., trajectory A1 or B1, to move to a position in which the camera (or cameras) can image the destination repository. This operation may permit the computing system to obtain images (e.g., image information), through use of the camera (or cameras) of the destination repository and thereby obtain information about destination repository for use in future robot arm actions. The destination repository approach trajectory may be calculated to begin at any location/configuration at which the robot arm is currently positioned. The first destination repository approach command may be calculated based on the first destination repository approach trajectory.

The at least one processing circuit may further be configured to calculate the first destination repository approach trajectory in a manner that is not based on the result of any repository detection operations or other operations using imagery or image information of the specific repository to which an object will be delivered. The first destination repository approach trajectory is a sub-trajectory for the robot arm to follow to approach the destination repository and the first destination repository approach command is generated based on the first destination repository approach trajectory. The first destination repository approach trajectory may be calculated based on an estimated location for the destination repository location within the object transfer region. In embodiments, the estimated location or the first destination repository approach trajectory may be stored in a memory of the computer system, for example, in embodiments that include non-mobile destination repository locations. In embodiments, the same first destination repository approach trajectory may be accessed from memory multiple times without revision, adjustment, or alteration to perform multiple first destination repository approach commands at different times, over a span of minutes, hours, days, weeks, and/or months.

In embodiments, the destination repository is a frame forming a set of shelves and cells, as discussed above, and is movable into and out of the object transfer region as well as to different locations within the object transfer region by a vehicle (e.g., an AGV). In such circumstances, the at least one processing circuit is further configured to determine an estimated location of the destination repository location based on a vehicle trajectory which the vehicle followed or is intended to follow.

The method 4000 may include an operation 4004, in which the computing system (or processing circuit thereof) receives image information describing the destination repository. As discussed above, the image information is generated or captured by the camera (or cameras) after the first destination repository approach command is executed and the camera is positioned for viewing or imaging the destination repository. Receiving the image information may further include any of the above described methods or techniques related to object recognition, e.g., with respect to the generation of spatial structural information (point clouds) of the imaged repositories.

In embodiments, the robot arm may be constrained in its movement, and thus may not be able to position the camera at a horizontal or head on viewpoint when capturing the image information, and/or may not be able to position the camera far enough from the repository to capture the entire repository. This may be due to limited reachability of a robot arm and/or tight spacing around the robot arm. As a result, the image information may in some scenarios show the shelf in a rotated, tilted, and/or off-angled manner, and/or capture only a portion of the shelf. In such cases, the image information may be normalized, as discussed above.

In an embodiment, the method 4000 includes operation 4006, in which the computing system performs, based on the image information, a repository detection operation that determines at least one of: repository structure information for describing a structure of the destination repository, repository pose information for describing a pose of the destination repository, or repository content information for describing whether one or more objects are present in the destination repository. Repository content information may further include information regarding pose and type of objects present in a destination repository. As discussed above, the image information of the destination repository is obtained by the computing system. The computing system then operates to analyze or process the image information to determine one or more of the repository structure information, repository pose information, and/or repository content information.

In embodiments, the computing system may perform the repository detection operation during a time at which the computing system is also executing at least one of the one of the source repository approach commands (operation 4008) and the object pickup command (operation 4010). As discussed above, the methods discussed herein may permit robotic systems to operate faster and with less delay. Accordingly, the computing system may perform some or all of the computations associated with the repository detection operation 4006 while the robotic arm is carrying out the sub-trajectories associated with the repository approach command and the object pickup command. Thus, it may be unnecessary for the robotic arm to pause while carrying out the described trajectories.

The image information may include all or at least a portion of a repository in a camera's field of view. The computing system may use the image information to more precisely determine a physical structure of the repository, and/or of an object on the repository. The structure may be determined directly from the image information, and/or may be determined by comparing the image information generated by the camera against, e.g., model repository templates and/or model object templates.

The repository detection operation 4006 may include a variety of optional steps/and or operations to improve system performance. The steps and/or operations to improve system performance are discussed below.

In embodiments, the repository detection operation may operate with a predefined repository mode (also referred to herein as a template). The processing circuit may be configured to determine whether the image information satisfies a predefined template matching condition when compared against a predefined repository model that describes repository structure. The predefined template matching condition represents a threshold, a likelihood, or a degree of match between a predefined repository model and a portion of the image information. The predefined repository model may be, for example, an image template to which the image information may be compared to determine the presence, alignment, and/or orientation of a repository within the second image information. As illustrated in FIG. 6, the image information representing the structure of repository 3110 may be compared against one or more predefined repository models 6110 and 6111 to identify a type of repository and thus access stored repository structure information associated with the type of repository. Comparisons with the predefined repository model may permit the processing circuit to improve and speed up further processing by using the predefined (e.g., already processed) template information at points at which the image information aligns with the predefined repository model, as discussed further below. In embodiments, the image information may be compared against multiple predefined repository models to identify a predefined repository model with which the image information satisfies the predefined template matching condition. The processing circuit may generate template matching information indicative of whether, how much, and in what manner the image information satisfies the predefined template matching condition. Template matching information obtained during a repository detection operation may be used in later operations, as discussed below, e.g., in an object placement operation.

In an embodiment, the repository detection operation 4006 may include an identification of features that may be, e.g., used in template matching, which may involve comparing the identified features in the image information against a template of the repository and/or a template of a target object. For example, if the computing system determines that a target object is at a particular region/cell of the repository, it may attempt to crop the image information so as to extract a specific portion corresponding to that cell, and use the extracted portion for template matching. In some instances, such a region may be determined based on known information regarding a setup of a particular repository. For instance, if a repository is transported into the area by an AGV, the movement of the AGV may have an possible error of, e.g., 2 cm. In this example, the AGV may remain directly under the shelf. Thus, the AGV and the repository may be up to 2 cm to the left or 2 cm to the right of an estimated location of the repository. This expected error may provide an expectation to the computing system for where an object or a cell is likely to appear in the image information, or more specifically an image region in which the object or cell is likely to appear. As a result, the computing system may search the image region or portion for image features which it may be expecting. If the computing system determines that the AGV has an error in terms of the precision of its movement (e.g., 2 cm), it may broaden the image region in which it searches for image features, so as to account for this possible error. For example, it may broaden the search region by 2 cm in one or more directions. The computing system may further determine, based on the error, a distance between the camera and the shelf when the camera generates the image information. If the AGV is expected to have a large amount of error between an expected versus actual position, then the computing system may cause the camera to be positioned farther from the shelf and from the AGV, so as to ensure that a relevant cell of the shelf falls within the camera's field of view.

The computing system may be expecting a structure of a shelf or shelf face geometry to appear in the image information, such as a horizontal level, the computing system may search for a straight line which may represent an edge of that level. If the computing system is expecting an object of a particular object type on the shelf (if the shelf is a source shelf), it may search for image features which match a template associated with the object type. More particularly, the computing system may search the image region or portion for features representing shelf geometry. To perform template matching, the computing system may attempt to overlay or align edges or other identified features which appear in the image information region or portion to edges in the predefined repository model.

The image information may describe respective depth values for multiple surface locations on the destination repository. The multiple surface locations may include, for example, a first surface location which is closer to the camera than a second surface location. The processing circuit may be configured to use the depth values in determining whether the image information satisfies the predefined template matching condition. For example, a level or degree of match between the image information and the predefined repository model may assign more weight to how closely the first location matches the predefined repository model than how closely the second location matches the predefined repository model. That is, locations that are closer to the camera may influence the matching process more than locations further from the camera. Surpassing a defined level or degree of match may be a whole or part of a predefined template matching condition.

In embodiments, the computing system may assign higher confidence or importance to certain points or locations in a scene captured by image information, and may give more weight to those points when performing template matching or, more generally, when determining a physical structure of the shelf or target object. The confidence assigned to a point may be based on its distance to the camera, and/or whether the point is being viewed by the camera head-on or being viewed at an angle. For example, if the camera was at an angle relative to a front of the shelf, such that its optical axis is oblique with a front or side of the shelf, some points on the shelf may have been closer to the camera relative to distances between the camera and other points on the shelf. Those points closer to the camera may be assigned higher confidence levels.

In some embodiments, confidence levels in various points may be assigned according to camera angles. For example, the camera may have a more head-on view of a first point, and may have a more oblique or angled view of a second point. That is, the first point and a surrounding portion of the front or side of the shelf may be more perpendicular to the camera or its optical axis, while the second point and a surrounding portion of the front or side of the shelf may be more oblique and less perpendicular to the camera. In these examples, the computing system may place an increased confidence in the first point based on its more perpendicular viewing angle relative to the camera, while the second point may have decreased confidence based on its more oblique viewing angle relative to the camera. In some instances, the relative levels of confidence based on the camera angles may be reversed.

When such points having different confidence levels are part of or represent features used in template matching, the computing system may place more weight in higher-confidence points matching certain template features, and may place less weight in lower-confidence points matching template features.

In embodiments, the computing system may perform template matching in a hierarchical manner, with multiple tiers of alignment. The multiple tiers of alignment may include alignment between the image information and one or more model templates at different levels of resolution or structure. For example, the higher tiers of alignment may include alignment between broad features of the image information with the one or more model templates while the lower tiers of alignment may include alignment between more specific features of the image information with the one or more model templates. Although three alignment tiers are discussed, more or fewer alignment tiers may be used in various embodiments.

In embodiments, the repository detection operation may include alignment at a first alignment tier based on broad features of the image information and a repository model. The repository detection operation may include determining a manner in which the image information is aligned with a first repository model (first alignment tier) which describes broad repository structural elements. For example, the first repository model may describe a frame of the repository structure. As discussed above, the processing circuit may identify, according to a predefined template matching condition, a repository model that matches the image information.

The highest, first tier of alignment may be used for global alignment that may have more tolerance to error, while the next tier(s) of alignment may be used for more refined alignment that may have lowest tolerance of error. The first tier alignment may involve a template that represents all or most of the structure of a shelf. The repository model at the first tier alignment level may, in some instances, be a high-level template (first repository model) that has a lower amount of detail/granularity. For instance, the high-level template may describe features such as an outer beam or outer wall forming the shelf. In the high-level tier of alignment, the computing system may attempt to overlay points in the image information to features in this template. The computing system may perform the high-level of template matching to attempt to align points in the image information with the above template. The high-level of template matching may be used to roughly identify global features of a shelf, such as an outer edge or outer wall of its housing. The high-level tier of alignment may result in an error of, e.g., a few centimeters between an estimated position of such a global feature and its actual position (e.g., because it uses a high-level template that has a low amount of detail), but this error may be sufficiently low to allow the computing system to plan a trajectory with a safety margin which will avoid collision with these global features of the shelf.

The processing circuit may further identify, based on the manner by which the image information is at least partially aligned with the first repository model (first alignment tier), a portion of the image information that represents more detailed or finer structural elements of repository in a second alignment tier. The portion of the image information that is identified may include repository portions of interest. The elements or features of the second alignment tier may represent smaller, more detailed, aspects of the repository. In embodiments, the elements represented by the second alignment tier may be considered sub-elements of the first alignment tier. For example, where the first alignment tier may include a frame structure of a repository, a second alignment tier may include shelving of a repository. In examples, the second alignment tier may include elements representative of specific sectors or specific areas of a repository. In examples, the second alignment tier may represent a layer of the repository including a sector of interest (e.g., a destination sector). Thus, for example, based on the manner by which the image information is at least partially aligned with the first repository model with a portion of the image information including a layer of the destination repository having a destination sector.

The processing circuit may further, after identification of the portion of the image information containing the portions of interest (e.g., a destination sector) determine a manner in which the portion of the image information is at least partially aligned with a second repository model, where the second repository model is representative of a second alignment tier including greater detail, greater resolution, and/or information on finer or smaller features of the repository. In examples, as discussed above, the second repository model may be representative of a specific sector of a repository.

In an embodiment, a second tier of alignment may involve the computing system zooming into and extract a portion of the image information to focus on a particular portion of the image information corresponding to the particular layer of the shelf, and attempting to match that portion of the image information with the second repository model. The portion which the computing system selects for the zooming may be based on the global alignment in the first alignment tier. That is, the global alignment in the highest tier of template matching may provide the computing system with a general indication of how the image information roughly aligns to various features of the repository, including an indication of which portion of the image information corresponds to a particular portion of interest, such as a layer or particular cell of the shelf. The global alignment can include some error, but provide sufficient accuracy for the extracted portion to reliably capture the relevant portion of interest. The computing system may then use the extracted portion of the image information to compare against the second template and attempt to align the extracted portion with the second template. This second tier of alignment may allow for more accuracy in determining a location of the specific portion of interest, for example, a particular layer or particular rail on the shelf, because it may involve a more precise template, and/or because it may involve a zoomed-in portion of the image information that focuses on the specific layer or cell of the shelf, which reduces an effect of imaging noise in other portions of the image information. Because the operation to pick up a target object that is sitting on a pair of rails using the end effector apparatus may have a low tolerance for error, the higher level of accuracy may be needed for in order to avoid collision between the end effector apparatus and the rails.

In an embodiment, the hierarchy may include a third tier of alignment for template matching. The third tier of alignment may involve a third repository model, which focuses on greater detail and/or more specific structure than the first or second repository models, such as, for example, the rail structure in the shelf, and may describe the rail structure with more precision than the second template. That is, the third tier of alignment may be used to identify and align with specific features identified within the portion of interest of the second level of alignment.

In an embodiment involving shelf type repositories, the computing system may extract a portion of the image information that corresponds to the rail structure, and use the rail structure to compare against the third template. For example, the computing system may use the second repository model to determine which portion of the image information corresponds to a pair of rails on the shelf. The computing system may extract the portion of the image information corresponding to the rails, and compare it against the third repository model to obtain an even more precise determination of a physical structure/layout and physical location of a pair of rails on which a target object is sitting (or on which a target object is to be placed).

In embodiments, after repository structure information is established, e.g., through template matching, repository pose information may be determined. For example, the computing system may determine whether the repository is positioned at an angle or tilted, rather than, for example, in a straight-up orientation. The computing system may identify features that are expected to be horizontal (e.g., shelves) and determine an angle from horizontal at which those features are disposed.

After the repository structural information and the repository pose information is determined, (e.g., once the shelf detection is fixed) the computing system may identify a target object on the repository, (e.g., to determine repository content information). The computing system may be configured to validate whether a target object captured by the image information belongs to or is associated with a specified object type. For instance, the computing system may use the image information to measure dimensions of the object, or determine whether the object has expected physical features, such as a lid.

The computing system may account for the alignment, such as rotation or angling, of the shelf, so as to provide the trajectory planning operations with a detection result that is more axis-aligned. The repository detection operation 4006 operation may need to provide an accurate representation of an object to a motion planning operation, such as that used to update the pre-planned trajectory.

In embodiments, the processing circuit may be configured to detect, from the image information, a plurality of edges of the repository that divide the repository into multiple regions. The processing circuit may further be configured to determine a plurality of imaginary bounding boxes, wherein each imaginary bounding box of the plurality of imaginary bounding boxes enclose one of the plurality of edges, or enclose one of the multiple regions.

In embodiments, the computing system may generate an imaginary bounding box which surrounds an identified target object. The object may reside entirely within the bounding box. Thus, if the motion planning can avoid collisions between the end effector apparatus and the bounding box, it will also likely ensure that the end effector apparatus does not collide with the object. The bounding box may simplify the movement of the robot for approaching and grasping the object, and penetrating the bounding box to move even closer to the object.

In an embodiment, the repository detection operation 4006 operation may generate various bounding boxes as a simplified representation of a geometry of the shelf or portions of the shelf. The bounding boxes may include one bounding box to represent a target cell or target object, wherein the bounding box represents space which the end effector apparatus can approach and penetrate, while the other bounding boxes may represent regions which the end effector apparatus should avoid (e.g., they may be occupied), so as to reduce the risk of collision.

The bounding boxes may collectively occupy every region of the shelf. That is, the bounding boxes may occupy an entirety of the space that is occupied by the shelf. The bounding boxes may identify spaces which the end effector apparatus or robot arm should avoid, and may be a simpler way of identifying spaces to avoid than providing the entire geometry of the shelf, which may overcomplicate motion planning and/or increase computation time and resources.

In an embodiment, the repository detection operation 4006 may determine whether a target object is at an angle relative to a horizontal orientation as part of the repository content information. Such a situation may occur when, e.g., the object pivots off one of the rails, resulting in the target object in a slanted orientation and/or angled pose relative to the horizontal orientation. If a gripper attempts to pick up the object from its bottom, the slanted orientation may cause a portion of the end effector apparatus to collide with a portion of the object. In an embodiment, the computing system may determine whether an object has fallen in a space beneath a target object as part of the repository content information. Such an object may be located between the target object and a rail on which the target object is disposed, and may obstruct a path of at least a portion of the end effector apparatus.

In embodiments, image noise may affect an ability of the computing system to accurately detect an edge. To account for issues caused by image noise, the computing system may use a statistical element, such as a histogram of pixel intensity or a histogram of depth values, to determine a location of an edge or feature in the image information. As discussed above, the image information may be captured in a 2D image, depth map, or point cloud indicating the coordinates and intensities of pixels representing a target repository or object. The presence of image noise may make determination of an edge difficult where pixel intensities may lack a strong and clear contrast line. For example, noise may cause pixel intensities to gradually change as an edge is approached. Using a histogram or other statistical technique may permit the accurate detection of edges in a noisy image. For example, the computing system may determine a physical edge to correspond with an edge or position at which the histogram indicates an inflection point or peak in pixel intensity.

In embodiments, the repository detection operation 4006 may compensate for image noise by inferring missing image information. For example, if the computing system is using a 2D image or a point cloud that represents a repository, the 2D image or point cloud may have one or more missing portions due to noise. The repository detection operation 4006 may be configured to infer the missing info by closing or filling in the gap, for example, by interpolation or other means.

In an embodiment the repository detection operation 4006 operation may be used to overcome challenges associated with a tight or crowded layout around the robot arm or repositories in the object transfer region or with limitations on the reachability of poses by a robot arm. For example, in an object transfer region, a first repository may be disposed between the robot arm and a second repository, making it difficult for a camera of the robot arm to reach a location suitable for imaging the second repository. These limitations may prevent a camera from generating image information with an optimal orientation or optimal coverage. When the image information is captured from non-optimal angles or viewpoints, viewpoint adjustment techniques as discussed herein may be used during the repository detection operation 4006.

The repository detection operation 4006 operation may be used to refine the computing system understanding of a geometry of a repository, which may be used to guide the robot. For example, a more refined model or map of the repository may permit the system to guide the robot around/away from collision with the repository. In an embodiment, the repository detection operation 4006 operation may calculate a buffer region or volume surrounding the repository to prevent collision between the robot arm and the repository.

In embodiments, the repository detection operation 4006 may further include determining, based on the image information, whether a destination sector in the destination repository is unoccupied or occupied. The destination sector, e.g., a sector in the destination repository to which an object is intended to be delivered, may be determined by the processing circuit. The destination sector may be selected based on the image information, based on determined repository structure information, predefined according to an operations plan, and/or determined via other means. During the repository detection operation, the processing circuit may be configured to determine whether the destination sector is occupied. If occupied, the processing circuit, during the repository detection operation 4006, may determine an alternate destination sector. The repository detection operation 4006 operation may further detect whether the object deviates a position from which the end effector apparatus usually picks up objects. Such a detection may be used to determine whether the object can be picked up, or whether the position of the object makes it infeasible for the robot to pick up. In such a situation, the repository detection operation 4006 operation may indicate that a pickable object has not been detected.

In an embodiment, the method 4000 includes operation 4008, in which the computing system outputs a source repository approach command for causing the robot arm to approach the source repository. The source repository approach command may be provided after the camera has generated the image information for describing the destination repository. The source repository approach command, when executed, can cause the robot arm to approach the source repository, e.g., as shown in FIG. 5B, along a source repository approach trajectory, e.g., A2, B2a/B2b. The source repository approach trajectory may be calculated to begin at an endpoint of a first destination repository trajectory. The source repository approach command may be calculated based on the source repository approach trajectory.

In embodiments, the source repository approach command may be generated in a manner that includes a two part trajectory having a first trajectory portion and a second trajectory portion. The two part trajectory, when executed by the robot, causes movement of the robot arm toward the source repository to pause after the first trajectory portion (e.g., at the end of B2a) during a first time period, and to resume movement during a second, subsequent time period (e.g., during B2b) to execute the second trajectory portion. During the pause, e.g., during the first time period, the camera may be controlled so as to capture a second set of image information of the source repository. The second image information may be used, as discussed below, during a second repository detection operation. As discussed above, the B movement cycle may be used at any time that the location, structure, pose, content, or other detail of the source repository is uncertain.

In an embodiment, the method 4000 includes the operation 4009, in which the computing system performs a second repository detection operation. The second repository detection operation may be similar to the operation 4006, considered as a first repository detection operation 4006. The first repository detection operation 4006 employs (first) image information captured by the camera that describes the destination repository. In the second repository detection operation 4009, the computing system may use second image information captured by the camera of the source repository, subsequent to execution of the source repository approach command. The second image information may include information describing the source repository and may be used to determine at least one of: source repository structure information for describing a structure of the source repository, source repository pose information for describing a pose of the source repository, or source repository content information for describing whether one or more objects are present in the source repository. The second image information may include information describing an object type or pose associated with the object to be picked up while the object is in the source repository. In some embodiments, the second image information, either the object pose information and/or source repository information may be used in generating the object pickup trajectory, as discussed below. Performing a second repository detection operation 4009 may be advantageous in environments in which the source repository is not fixed.

In embodiments, the second repository detection operation may be performed during either the first time period (e.g., a pause after the first portion of the source repository approach trajectory B2a) or during the second time period (e.g., during the second portion of the source repository approach trajectory B2b). In this manner, the computing system may save time, by performing the processing of the second repository detection operation, that may be used to modify the object pickup trajectory, while initial stages of the object pickup trajectory are being executed.

The second repository detection operation 4009 may include any or all of the steps, methods, and features of the first repository detection operation 4006, as described above, in any combination.

In an embodiment, the method 4000 includes operation 4010, in which the computing system outputs an object pickup command. The object pickup command causes the end effector apparatus of the robot arm to pick up an object from the source repository. The object pickup command may be executed after the source repository approach command is executed and the robot arm is in position to pick up or grasp an object from the source repository. As shown in FIG. 5B, the robot arm may follow an object pickup trajectory, e.g., trajectory A3 or B3, in executing the object pickup command. The object pickup trajectory, which is a trajectory for the robot arm to follow to pick up or grasp an object, may be calculated to begin, for example, at an endpoint of a source repository approach trajectory. The object pickup command may be calculated based on the object pickup trajectory.

In embodiments, the at least one processing circuit may further be configured to calculate the source repository approach trajectory (in operation 4008) and the object pickup trajectory (in operation 4010) based on a predefined location at which the source repository is fixed in the transfer region. Such an approach may occur when the source repository is fixed to a predefined location within the transfer region. The predefined location of the source repository may be stored, for example, in a memory device associated with the computer system.

In embodiments, instead of using the predefined location for calculating the object pickup trajectory, the computing system may use the information generated during the second repository detection operation to calculate the object pickup trajectory. For example, in situations wherein the source repository is not fixed within the transfer region, using the second image information to calculate the object pickup trajectory may provide advantages in accuracy.

As discussed above, in some embodiments, the computing system may capture second image information of the source repository prior to executing the object pickup command. In such embodiments, the second image information (including information about the object pose or source repository) may be used to generate the object pickup trajectory for generating the object pickup command. As discussed above, the second image information may be obtained during a pause in Movement Cycle B, i.e., after a first portion of a source repository approach trajectory is executed. In such embodiments, the second image information may be used to modify, or alter a portion of the object pickup trajectory from an initial pre-planned trajectory or generate a new trajectory as needed. The portion of the trajectory that is modified or changed may be an ending portion of the object pickup trajectory, that includes the operation for picking up of the object. Thus, a first portion of the initial pre-planned trajectory for object pickup may be performed according to the initial pre-planning while a second portion of the initial pre-planned trajectory for object pickup, taking place after the first portion, may be modified, altered, and/or changed according to the second image information. In embodiments, the entirety of the initial pre-planed object pickup trajectory may be modified, altered, or otherwise adjusted according to the second repository detection operation.

In an embodiment, the method 4000 includes operation 4012, in which the computing system outputs a second destination repository approach command that causes the robot arm to approach the destination repository a second time, after the object pickup command has been executed. In this circumstance, the robot arm approaches the second destination repository while carrying/transporting the object picked up from the source repository. As shown in FIGS. 5B and 5C, the robot arm may follow a second destination repository approach trajectory, e.g., trajectory A4, B4, which is a trajectory for approaching the destination repository in executing the second destination repository approach command. The second destination approach trajectory may be calculated to begin at an endpoint of the object pickup trajectory. The second destination repository approach command may be calculated based on the second destination repository approach trajectory.

In embodiments, the second destination repository approach command may be generated without using the image information generated during the repository detection operation, instead of based on the repository detection operation and/or on any image information acquired of the specific destination repository. For example, the second destination repository approach command may be generated based on the same or similar types of information that the first destination repository approach command is generated, e.g., an estimated location for the destination repository location within the object transfer region, vehicle trajectory information indicative of a destination repository location, a stored trajectory, etc.

In an embodiment, the method 4000 includes the operation 4014, in which the computing system outputs an object placement command that causes the end effector apparatus to place the object in the destination repository. The object placement command is executed after the second destination repository approach command has caused the robot arm to approach the destination repository. The object placement command is generated based on a result of the repository detection operation, wherein the result includes at least one of the repository structure information, the repository pose information, or the repository content information. Thus, the object placement command causes the robot arm to follow an object placement trajectory, e.g., A5, B5 as shown in FIGS. 5B and 5C, to place the object in the destination repository based on the analysis of the image information captured by the camera after the first destination repository approach. The object placement trajectory may, for example, begin at an endpoint of the second destination repository approach trajectory.

Generating the object placement command may be subject to several additional constraints and/or operations. For example, in embodiments, the object placement command may be generated based on the template matching information generated during the repository detection operation. In further embodiments, the object placement command may be generated based on the manner by which the portion of the image information is at least partially aligned with the second repository model, as discussed above with respect to the object repository detection command and hierarchical alignment. In further embodiments, the object placement command may be generated based on the plurality of bounding boxes, as discussed above with respect to the object repository detection command.

In embodiments, the at least one processing circuit is configured to calculate an object placement trajectory [e.g., A5 or B5] for generating the object placement command based on a result of the repository detection operation while at least one of the source repository approach command, object pickup command, or second destination repository approach command is being executed, e.g., trajectories A2/B2a/B2b, A3/B3, and A4/B4. Accordingly, as previously discussed the processing circuit may perform processing and/or computations during a period while the robot arm is in motion, to increase efficiency.

The various sub-trajectories, as discussed above with respect to method 4000, may be part of an initial pre-planned trajectory. The various sub-trajectories may be adjusted, e.g., altered or changed from the initial pre-planned trajectory. Adjustment of a trajectory may involve altering only a portion of a trajectory, for example, while retaining other portions of a trajectory. Adjustment of a trajectory may involve changing a trajectory, for example, by replacing the entirety of the trajectory with an alternate trajectory. For example, in an embodiment, the initial pre-planned trajectory discussed above may be generated based on various estimated information. In some instances, the estimated information may include a model (e.g., CAD model) of the source or destination repository and/or a model of a target object. For example, the model of the destination repository, e.g., a shelf, may identify how many layers are in the shelf, and may identify how many cells are in each layer of the shelf, or more generally may identify object placement locations in the shelf, and/or a height of the shell. The model of the target object may, for example, describe a shape and/or size (e.g., dimensions) of the target object.

In some instances, the estimated information in computing the initial pre-planned trajectory may include information regarding a planned route of an AGV which transported a shelf-type repository into a shelf area of the transfer region. For example, the AGV may be programmed to follow a particular route (e.g., based on floor markers). This known route of the AGV may indicate a location at which the AGV stopped. The indicated location of the AGV may provide an estimate of a location of the shelf in the shelf area. In some implementations, the computing system may keep track of which cell(s) of a shelf has had an object placed in them, and may use this information to determine whether a particular cell in the shelf is vacant or occupied.

The computing system may determine or compute an initial pre-planned trajectory in various ways. For example, in embodiments, the computing system may generate an initial pre-planned trajectory as part of moving an object in the shelf area. The computing system may cache or otherwise store the initial pre-planned trajectory so that the initial pre-planned trajectory may be reused for moving other objects in the shelf area. In an embodiment, the computing system may determine, based on a model of a shelf, how many cells/compartments are in the shelf, and locations of the compartments. The computing system may use dummy target object positions, and dummy objects to generate the rough trajectories.

In embodiments, after the computing system has generated the initial pre-planned trajectory in advance, e.g., based on initial information describing locations (fixed or mobile) of source and destination repositories, the computing system may adjust the initial pre-planned trajectory based on further operations. For example, the computing system may adjust the initial pre-planned trajectory as a result of a repository detection operation 4006. In some implementations, the initial pre-planned trajectory may be generated based on the initial information lacking and sufficient accuracy for some operations in terms of describing a source or destination repository, and/or in terms of describing an object disposed in a source repository. These potential inaccuracies may, for example, cause an end effector apparatus to move generally to the repository, but to a wrong position on the shelf, and/or have a wrong orientation (e.g., wrong roll, pitch, or yaw) for picking up an object from the shelf and/or placing an object on the repository. Thus, the computing system may update the initial pre-planned trajectory, especially a portion of the initial pre-planned trajectory which controls precise movement of the end effector apparatus to have close interaction with the repository or an object thereon.

For example, for the trajectory described above for movement Cycle A, shown in FIG. 5B, the computing system may adjust the initial pre-planned trajectory to generate the object pickup trajectory, e.g., A5, based on analysis of the image information received subsequent to the first destination repository approach command and the repository detection operation. Further, the computing system may not need to update the initial pre-planned trajectory to arrive at the first destination repository approach trajectory, e.g., A1, because this sub-trajectory is used to position a camera generally in front of the repository, or more specifically in front of a specified location of the repository (e.g., a cell of the destination shelf), and the initial pre-planned trajectory provides sufficient precision for such a purpose. The computing system may have information, for example, on a location of an AGV used to transport the destination shelf into the shelf area (with a margin of error of, e.g., 2-3 cm), and may use this information to determine a general location of the destination shelf. This general location may be sufficiently accurate, because generating a image information of the destination shelf may be accomplished by placing the camera generally front of the destination shelf. The computing system may not need to place the camera to a specific location or a specific orientation. Rather, the camera may capture relevant information regarding the destination repository as long as its location falls within a threshold range of locations.

In embodiments, the source repository approach trajectory and the object pickup trajectory (e.g., A2 and A3) may not require adjustment, because a position of the source repository and a position of an object on the source repository may be fixed or otherwise constrained, such that the position of the source repository and the position of the object on the source repository may be known by the computing system with a sufficiently high level of precision. For instance, the source repository may be a conveyor fastened to a floor, such that is position is fixed. Further, the conveyor may have blockers for blocking an object moving along the conveyor. The blockers may have known positions, which may be used by the computing system to accurately determine a location of an object on the conveyor. Thus, the computing system may not need to perform trajectory adjustment nor conveyor/object detection for the conveyor.

In embodiments, the computing system may leave the second destination approach trajectory, e.g., A4, unchanged from the initial pre-planned trajectory. For example, she second destination approach trajectory may be used to cause the end effector apparatus, after it has picked up a target object from the conveyor, to approach and come within proximity to the destination shelf. The sub-trajectory A4 may provide a sufficient level of precision for this approach.

In embodiments, the computing system may adjust the initial pre-planned trajectory to arrive at the object placement trajectory (e.g., trajectory A5) based on a result of the repository detection operation. The object placement trajectory is used for close interaction with the destination repository, and may require a high level of precision for the end effector apparatus to correctly place the target object into a specific portion of the repository, e.g., a specified cell of the shelf.

As discussed above, the initial pre-planned trajectory may be based on estimated information which lacks sufficient accuracy in terms of describing the destination shelf, and thus may not provide sufficient precision to correctly place the object into the shelf. Thus, the computing system may adjust the initial pre-planned trajectory to arrive at the object placement trajectory based on the repository detection operation, such that the adjusted trajectory may achieve a level of precision for correctly placing the object into the destination shelf. As an example, the object placement trajectory may cause the end effector apparatus to have a different endpoint location compared to a corresponding portion of the initial pre-planned trajectory, and/or may cause the end effector apparatus to have a different orientation at the endpoint location as compared to a corresponding portion of the initial pre-planned trajectory. Thus, in embodiments, when the robot is moving, it may follow the initial pre-planned trajectory as the first destination repository approach trajectory, the source repository approach trajectory, the object pickup trajectory, and the second destination approach trajectory, and then execute the object placement trajectory, which is adjusted as compared to the corresponding portion of the initial pre-planned trajectory.

Additional Discussion of Various Embodiments

Embodiment 1 includes a computing system, a method performed by the computing system, or a non-transitory computer readable medium including instructions for implementing the method. The computing system may include a communication interface configured to communicate with a robot having a robot arm that includes or is attached to an end effector apparatus, and having a camera attached to the robot arm and at least one processing circuit configured, when the robot is in an object transfer region that includes a source repository and a destination repository, to perform the following for transferring an object from the source repository to the destination repository. The method may include outputting a first destination repository approach command for causing the robot arm to approach the destination repository in a manner that causes the camera to be pointed at the destination repository; receiving image information for describing the destination repository, wherein the image information is generated by the camera after the first destination repository approach command is executed; performing, based on the image information, a repository detection operation that determines at least one of: repository structure information for describing a structure of the destination repository, repository pose information for describing a pose of the destination repository, or repository content information for describing whether one or more objects are present in the destination repository; outputting a source repository approach command for causing the robot arm to approach the source repository after the camera has generated the image information for describing the destination repository; outputting an object pickup command for causing the end effector apparatus to pick up the object from the source repository after the source repository approach command is executed; outputting a second destination repository approach command for causing the robot arm to approach the destination repository after the object pickup command is executed; and outputting an object placement command for causing the end effector apparatus to place the object in the destination repository after the second destination repository approach command is executed, wherein the object placement command is generated based on a result of the repository detection operation, wherein the result includes at least one of the repository structure information, the repository pose information, or the repository content information.

Embodiment 2 includes all of the features of embodiment 1, wherein the at least one processing circuit is configured to perform the repository detection operation based on the image information while at least one of the source repository approach command or the object pickup command is being executed.

Embodiment 3 includes all of the features of any of embodiments 1 or 2, wherein the at least one processing circuit is configured to calculate an object placement trajectory based on the result of the repository detection operation while at least one of the source repository approach command, object pickup command, or second destination repository approach command is being executed, wherein the object placement trajectory is a trajectory for the end effector apparatus to follow to place the object in the destination repository, and wherein the object placement command is generated based on the object placement trajectory.

Embodiment 4 includes the features of any of embodiments 1-3, wherein the at least one processing circuit is configured to calculate a first destination repository approach trajectory in a manner which is not based on the result of the repository detection operation, wherein the first destination repository approach trajectory is for the robot arm to follow to approach the destination repository, and wherein the first destination repository approach command is generated based on the first destination repository approach trajectory.

Embodiment 5 includes the features of any of embodiments 1-4, wherein the at least one processing circuit is configured, when the destination repository is a frame forming a set of shelves and is movable into and out of the transfer region by a vehicle, to determine a destination repository location based on a vehicle trajectory which the vehicle followed or is to follow, wherein the destination repository location is an estimated location for the destination repository in the transfer region.

Embodiment 6 includes the features of any of embodiments 1-5, wherein the at least one processing circuit is configured to calculate a second destination repository approach trajectory to be followed after the object pickup command is executed, wherein the second destination repository approach trajectory is calculated in a manner which is not based on the result of the repository detection operation, and wherein the object placement trajectory is calculated to begin at an endpoint of the second destination repository approach trajectory.

Embodiment 7 includes the features of any of embodiments 1-6, wherein the at least one processing circuit is configured, when the source repository is fixed to a predefined location in the transfer region, to calculate a source repository approach trajectory and an object pickup trajectory based on the predefined location at which the source repository is fixed in the transfer region, wherein the source repository approach trajectory is a trajectory for the robot arm to follow to approach the source repository, and the source repository approach command is generated based on the source repository approach trajectory, and wherein the object pickup trajectory is a trajectory for the end effector apparatus to follow to pick up the object from the source repository, and the object pickup command is generated based on the object pickup trajectory.

Embodiment 8 includes the features of any of embodiments 1-7, wherein the repository detection operation is a first repository detection operation, and the image information is a first set of image information, wherein the at least one processing circuit is configured, when the source repository is not fixed to the transfer region, to perform the following: receiving a second set of image information for describing the source repository, wherein the second set of image information is generated by the camera during or after execution of the source repository approach command; performing a second repository detection operation based on the second set of image information; and calculating an object pickup trajectory based on a result of the second repository detection operation, wherein the object pickup trajectory is a trajectory for the end effector apparatus to follow to pick up the object from the source repository, and the object pickup command is generated based on the object pickup trajectory.

Embodiment 9 includes the features of any of embodiments 1-8, wherein the at least one processing circuit is configured to perform the second repository detection operation by determining, based on the second set of image information, an object pose associated with the object while the object is in the source repository, wherein the object pickup command is generated based on the object pose.

Embodiment 10 includes the features of any of embodiments 1-9, wherein the at least one processing circuit is configured to: generate the source repository approach command in a manner that, when executed by the robot, causes movement of the robot arm toward the source repository to pause during a first time period, and to resume during a second, subsequent time period; cause the second set of image information to be generated by the camera during the first time period, and perform the second repository detection operation during the second time period.

Embodiment 11 includes the features of any of embodiments 1-10, wherein the at least one processing circuit is configured to perform the repository detection operation by determining a manner by which the image information is at least partially aligned with a predefined repository model that describes repository structure, wherein the object placement command is generated based on the manner by which the image information is at least partially aligned with the predefined repository model.

Embodiment 12 includes the features of any of embodiments 1-11, wherein the at least one processing circuit is configured to perform the repository detection operation by determining whether the image information satisfies a predefined template matching condition when compared against a predefined repository model that describes repository structure, wherein the at least one processing circuit is configured, in response to a determination that the image information satisfies the predefined template matching condition, to generate the object placement command based on the predefined repository model.

Embodiment 13 includes the features of any of embodiments 1-12, wherein the image information describes respective depth values for multiple surface locations on the destination repository, and wherein the at least one processing circuit is configured, when the multiple surface locations include a first surface location which is closer than a second surface location to the camera, to determine a level of match between the image information and the predefined repository model in a manner that assigns more weight to how closely the first location matches the predefined repository model than how closely the second location matches the predefined repository model.

Embodiment 14 includes the features of any of embodiments 1-13, wherein the at least one processing circuit is configured to determine a destination sector in the destination repository at which the object is to be placed, and is configured to perform the repository detection operation by determining, based on the image information, whether the destination sector is unoccupied.

Embodiment 15 includes the features of any of embodiments 1-14, wherein the at least one processing circuit is configured to determine a destination sector in the destination repository at which the object is to be placed, and is configured to perform the repository detection operation by: determining a manner by which the image information is at least partially aligned with a first repository model which describes repository structure; identifying, based on the manner by which the image information is at least partially aligned with the first repository model, a portion of the image information that represents at least a layer of the destination repository which includes the destination sector; determining a manner by which the portion of the image information is at least partially aligned with a second repository model that describes at least a layer of the repository structure, wherein the object placement command is generated based on the manner by which the portion of the image information is at least partially aligned with the second repository model.

Embodiment 16 includes the features of any of embodiments 1-15, wherein the first repository model describes a frame of the repository structure, such that at least one processing circuit is configured to determine a manner by which the image information is aligned with the frame described by the first repository model.

Embodiment 17 includes the features of any of embodiments 1-16, wherein the at least one processing circuit is configured to: detect, from the image information, a plurality of edges of the destination repository that divide the destination repository into multiple regions; determine a plurality of imaginary bounding boxes, wherein each imaginary bounding box of the plurality of imaginary bounding boxes enclose one of the plurality of edges, or enclose one of the multiple regions, wherein the object placement command is generated based on the plurality of bounding boxes.

It will be apparent to one of ordinary skill in the relevant arts that other suitable modifications and adaptations to the methods and applications described herein can be made without departing from the scope of any of the embodiments. The embodiments described above are illustrative examples and it should not be construed that the present invention is limited to these particular embodiments. It should be understood that various embodiments disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the methods or processes). In addition, while certain features of embodiments hereof are described as being performed by a single component, module, or unit for purposes of clarity, it should be understood that the features and functions described herein may be performed by any combination of components, units, or modules. Thus, various changes and modifications may be affected by one skilled in the art without departing from the spirit or scope of the invention as defined in the appended claims.

The invention claimed is:

1. A computing system comprising:
a communication interface configured to communicate with a robot having a robot arm that includes or is attached to an end effector apparatus, and having a camera attached to the robot arm;
at least one processing circuit configured, when the robot is in an object transfer region that includes a source repository and a destination repository, to perform the following for transferring an object from the source repository to the destination repository:
outputting a first destination repository approach command for causing the robot arm to approach a predetermined location of the destination repository in a manner that causes the camera to be pointed at the destination repository while the end effector is not transporting an object;
receiving image information describing the destination repository generated by the camera after the first destination repository approach command is executed;
performing, based on the image information, a repository detection operation that calculates and/or validates and/or updates at least one of: repository structure information for describing a structure of the destination repository or repository pose information for describing a pose of the destination repository;
outputting a source repository approach command for causing the robot arm to approach the source repository after the camera has generated the image information for describing the destination repository;
outputting an object pickup command for causing the end effector apparatus to pick up the object from the source repository;
outputting a second destination repository approach command for causing the robot arm to approach the destination repository after the object pickup command is executed; and
outputting an object placement command for causing the end effector apparatus to place the object in the destination repository after the second destination repository approach command is executed, wherein the object placement command is generated based on at least one of the repository structure information or the repository pose information.

2. The computing system of claim 1, wherein the at least one processing circuit is further configured to perform the repository detection operation based on the image information while at least one of the source repository approach command or the object pickup command is being executed.

3. The computing system of claim 1, wherein the at least one processing circuit is further configured to calculate an object placement trajectory based on the result of the repository detection operation while at least one of the source repository approach command, the object pickup command, or the second destination repository approach command is being executed, wherein the object placement trajectory is a trajectory for the end effector apparatus to follow to place the object in the destination repository, and wherein the object placement command is generated based on the object placement trajectory.

4. The computing system of claim 3, wherein the at least one processing circuit is further configured to calculate a first destination repository approach trajectory in a manner which is not based on the result of the repository detection operation, wherein the first destination repository approach trajectory is for the robot arm to follow to approach the destination repository, and wherein the first destination repository approach command is generated based on the first destination repository approach trajectory.

5. The computing system of claim 4, wherein the at least one processing circuit is further configured, when the destination repository is a frame forming a set of shelves and is movable into and out of the object transfer region by a vehicle, to calculate a destination repository location based on a vehicle trajectory which the vehicle followed or is to follow, wherein the destination repository location is an estimated location for the destination repository in the object transfer region.

6. The computing system of claim 4, wherein the at least one processing circuit is further configured to calculate a second destination repository approach trajectory to be followed after the object pickup command is executed, wherein the second destination repository approach trajectory is calculated in a manner which is not based on the result of the repository detection operation, and wherein the object placement trajectory is calculated to begin at an endpoint of the second destination repository approach trajectory.

7. The computing system of claim 1, wherein the at least one processing circuit is further configured, when the source repository is fixed to a predefined location in the object transfer region, to calculate a source repository approach trajectory and an object pickup trajectory based on the predefined location at which the source repository is fixed in the object transfer region, wherein the source repository approach trajectory is a trajectory for the robot arm to follow to approach the source repository, and the source repository approach command is generated based on the source repository approach trajectory, and wherein the object pickup trajectory is a trajectory for the end effector apparatus to follow to pick up the object from the source repository, and the object pickup command is generated based on the object pickup trajectory.

8. The computing system of claim 1, wherein the repository detection operation is a first repository detection operation, and the image information is a first set of image information, wherein the at least one processing circuit is further configured, when the source repository is not fixed to the object transfer region, to perform the following:

receiving a second set of image information for describing the source repository, wherein the second set of image information is generated by the camera during execution of the source repository approach command;

performing a second repository detection operation based on the second set of image information; and calculating at least a portion of an object pickup trajectory based on a result of the second repository detection operation, wherein the object pickup trajectory is a trajectory for the end effector apparatus to follow to pick up the object from the source repository, and the object pickup command is generated based on the object pickup trajectory.

9. The computing system of claim 8, wherein the at least one processing circuit is further configured to perform the second repository detection operation by determining, based on the second set of image information, an object pose associated with the object while the object is in the source repository, wherein the object pickup command is generated based on the object pose.

10. The computing system of claim 8, wherein the at least one processing circuit is further configured to:

generate the source repository approach command in a manner that, when executed by the robot, causes movement of the robot arm toward the source repository to pause during a first time period, and to resume during a second, subsequent time period;

cause the second set of image information to be generated by the camera during the first time period; and perform the second repository detection operation during the second time period.

11. The computing system of claim 1, wherein the at least one processing circuit is further configured to perform the repository detection operation by determining a manner by which the image information is at least partially aligned with a predefined repository model that describes repository structure, wherein the object placement command is generated based on the manner by which the image information is at least partially aligned with the predefined repository model.

12. The computing system of claim 1, wherein the at least one processing circuit is further configured to perform the repository detection operation by determining whether the image information satisfies a predefined template matching condition when compared against a predefined repository model that describes repository structure, wherein the at least one processing circuit is configured, in response to a determination that the image information satisfies the predefined template matching condition, to generate the object placement command based on the predefined repository model.

13. The computing system of claim 12, wherein the image information describes respective depth values for multiple surface locations on the destination repository, and wherein the at least one processing circuit is further configured, when the multiple surface locations include a first surface location which is closer than a second surface location to the camera, to determine a level of match between the image information and the predefined repository model in a manner that assigns more weight to how closely the first location matches the predefined repository model than how closely the second location matches the predefined repository model.

14. The computing system of claim 1, wherein the at least one processing circuit is further configured to determine a destination sector in the destination repository at which the object is to be placed, and is configured to perform the repository detection operation by determining, based on the image information, whether the destination sector is unoccupied.

15. The computing system of claim 1, wherein the at least one processing circuit is further configured to determine a destination sector in the destination repository at which the object is to be placed, and is configured to perform the repository detection operation by:

determining a manner by which the image information is at least partially aligned with a first repository model which describes repository structure;

identifying, based on the manner by which the image information is at least partially aligned with the first repository model, a portion of the image information that represents at least a layer of the destination repository which includes the destination sector;

determining a manner by which the portion of the image information is at least partially aligned with a second repository model that describes at least a layer of the repository structure; and wherein the object placement command is generated based on the manner by which the portion of the image information is at least partially aligned with the second repository model.

16. The computing system of claim 15, wherein the first repository model describes a frame of the repository structure, such that at least one processing circuit is further configured to determine a manner by which the image information is aligned with the frame described by the first repository model.

17. The computing system of claim 16, wherein the at least one processing circuit is further configured to:

detect, from the image information, a plurality of edges of the destination repository that divide the destination repository into multiple regions;

determine a plurality of imaginary bounding boxes, wherein each imaginary bounding box of the plurality of imaginary bounding boxes enclose one of the plurality of edges, or encloses one of the multiple regions; and wherein the object placement command is generated based on the plurality of imaginary bounding boxes.

18. A robotic control method, for transferring an object from a source repository to a destination repository, operable by at least one processing circuit via a communication interface configured to communicate with a robot having a robot arm that includes or is attached to an end effector apparatus, and having a camera attached to the robot arm, the method comprising:

outputting a first destination repository approach command for causing the robot arm to approach a predetermined location of the destination repository in a manner that causes the camera to be pointed at the destination repository while the end effector is not transporting an object;

receiving image information describing the destination repository generated by the camera after the first destination repository approach command is executed;

performing, based on the image information, a repository detection operation that determines and/or validates and/or updates at least one of: repository structure information for describing a structure of the destination repository or repository pose information for describing a pose of the destination repository;

outputting a source repository approach command for causing the robot arm to approach the source repository after the camera has generated the image information for describing the destination repository;

outputting an object pickup command for causing the end effector apparatus to pick up the object from the source repository;

outputting a second destination repository approach command for causing the robot arm to approach the destination repository after the object pickup command is executed; and outputting an object placement command for causing the end effector apparatus to place the object in the destination repository after the second destination repository approach command is executed, wherein the object placement command is generated based on at least one of the repository structure information or the repository pose information.

19. A non-transitory computer readable medium, configured with executable instructions for implementing a robotic control method for transferring an object from a source repository to a destination repository, operable by at least one processing circuit via a communication interface configured to communicate with a robot having a robot arm that includes or is attached to an end effector apparatus, and having a camera attached to the robot arm, the method comprising:

outputting a first destination repository approach command for causing the robot arm to approach a predetermined location of the destination repository in a manner that causes the camera to be pointed at the destination repository while the end effector is not transporting an object;

receiving image information describing the destination repository generated by the camera after the first destination repository approach command is executed;

performing, based on the image information, a repository detection operation that determines and/or validates and/or updates at least one of: repository structure information for describing a structure of the destination repository or repository pose information for describing a pose of the destination repository;

outputting a source repository approach command for causing the robot arm to approach the source repository after the camera has generated the image information for describing the destination repository;

outputting an object pickup command for causing the end effector apparatus to pick up the object from the source repository;

outputting a second destination repository approach command for causing the robot arm to approach the destination repository after the object pickup command is executed; and outputting an object placement command for causing the end effector apparatus to place the object in the destination repository after the second destination repository approach command is executed, wherein the object placement command is generated based on at least one of the repository structure information or the repository pose information.

* * * * *